United States Patent
Linnenbrink et al.

(10) Patent No.: US 6,377,514 B1
(45) Date of Patent: Apr. 23, 2002

(54) ACOUSTIC LENS-BASED SWIMMER'S SONAR

(75) Inventors: Thomas E. Linnenbrink, Colorado Springs, CO (US); Charles S. Desilets, Edmonds, WA (US); Marshall K. Quick, Colorado Springs, CO (US); Thomas K. Bohley; Timothy G. O'Shaughnessy, both of Elbert, CO (US); Lyle E. Whelchel, Snohomish; R. Carver Anderson, Seattle, both of WA (US)

(73) Assignee: Q-Dot, Inc., Colorado Springs, CO (US)

( * ) Notice: Subject to any disclaimer, the term of this patent is extended or adjusted under 35 U.S.C. 154(b) by 0 days.

(21) Appl. No.: 09/543,492

(22) Filed: Apr. 6, 2000

Related U.S. Application Data

(60) Provisional application No. 60/127,907, filed on Apr. 6, 1999, and provisional application No. 60/127,909, filed on Apr. 6, 1999.

(51) Int. Cl.[7] ............................................... G03B 42/06
(52) U.S. Cl. ......................................... 367/11; 367/910
(58) Field of Search .............................. 367/7, 11, 162, 367/903, 910

(56) References Cited

U.S. PATENT DOCUMENTS

| | | | |
|---|---|---|---|
| 4,158,781 A | 6/1979 | Skinner et al. | ............... 307/99 |
| 5,140,558 A | 8/1992 | Harrison, Jr. et al. | ............ 367/7 |
| 5,329,498 A | 7/1994 | Greenstein | ................... 367/155 |
| 5,406,163 A | 4/1995 | Carson et al. | ............... 310/334 |
| 5,474,073 A | * 12/1995 | Schwartz et al. | ........... 367/105 |
| 5,592,730 A | 1/1997 | Greenstein et al. | ........... 29/594 |
| 5,744,898 A | 4/1998 | Smith et al. | ................. 310/334 |
| 5,805,147 A | 9/1998 | Tokioka et al. | ............. 345/173 |

* cited by examiner

*Primary Examiner*—Daniel T. Pihulic
(74) *Attorney, Agent, or Firm*—Welsh & Katz, Ltd.

(57) ABSTRACT

An acoustic/video processing stack of a plurality of substantially identical acoustic/video processing stacks is provided for attachment to a processing stack backplane and which together generate a VGA signal for display of a three-dimensional acoustic image. The acoustic/video processing stack includes a two-dimensional array of transducer elements, a companion chip block coupled to and adapted to transceive acoustic signals under a time-division multiplexed format through the transducer elements and to provide a portion of the VGA signal together generated by the plurality of acoustic/video processing stacks and a backing block disposed between the two-dimensional array and companion chip block and adapted to acoustically isolate the two-dimensional transducer array from the companion chip block, said companion chip block and backing block being of a size and diameter substantially the same as the two-dimensional transducer array.

38 Claims, 26 Drawing Sheets

AVC MODULES
HORIZONTAL MODULES @ CENTER 11
VERTICAL MODULES @ CENTER 8
TOTAL MODULES ON BACKPLANE 76
ELEMENTS PER AVC MODULES
HORIZONTAL ELEMENTS 9
VERTICAL ELEMENTS 1 2
TOTAL ELEMENTS/AVC MODULE 108
ELEMENT PER AVC
HORIZONTAL ELEMENTS@CENTER 99
VERTICAL ELEMENTS @ CENTER 96
TOTAL ELEMENTS ON BACKPLANE 8208
TOTAL ELEMENTS WITHIN
FOCUSED REGION OF FOCAL PLANE 7700

TYP. 108 CLUSTERS

FIG. 13
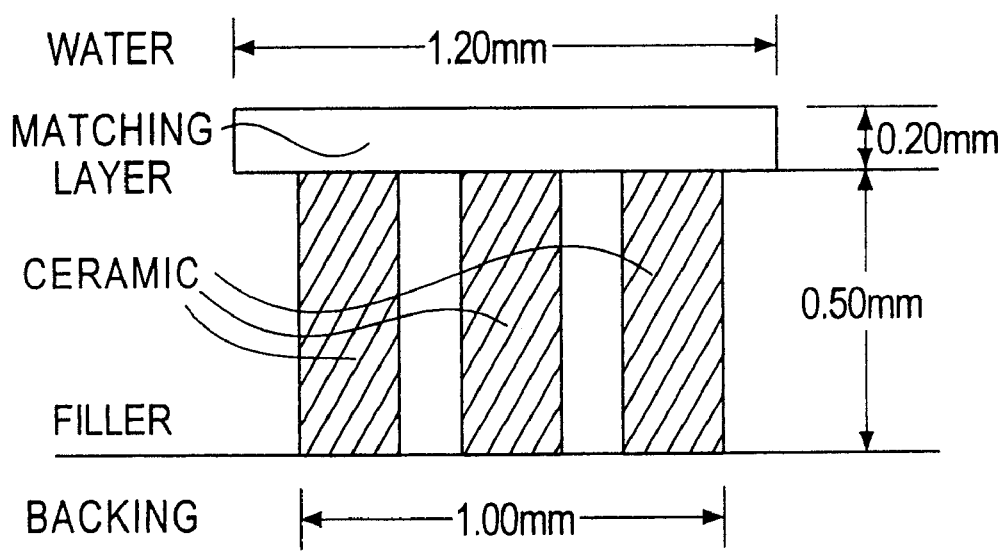
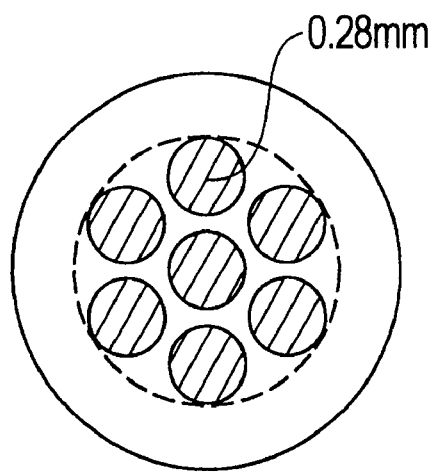

ACOUSTIC LENS-BASED SWIMMER'S SONAR

This application claims the benefit of U.S. Provisional Patent Application No. 60/127,907 filed Apr. 6, 1999 and claims benefit of 60/127,909 filed Apr. 6, 1999.

FIELD OF THE INVENTION

The field of the invention relates to ultrasonic imaging and more particular to portable imaging devices.

BACKGROUND OF THE INVENTION

Portable ultrasonic imaging devices are generally known. Such devices are typically used in medical applications and are intentionally limited in range.

Ultrasonic imaging devices are typically provided with an ultrasonic transducer which may include one or more ultrasonic transducer elements. The transducer element is typically a piezoelectric device which emits a sound pulse upon application of an electric potential across the transducer element. In the case of ultrasonic imaging devices, the ultrasonic transducer elements are typically arranged in two-directional arrays.

In operation, the transducer elements are typically actuated simultaneously or in some predetermined order to create an ultrasonic pulse. The pulse propagates outwards from the array in a well-known manner through a propagation medium. As the pulse encounters discontinuities in the medium a portion of the pulse is reflected. As the pulse is reflected, it travels back to and encounters the transducer.

Within the transducer, the amplitude, direction of arrival and time since the initial pulse are measured. From the measured amplitude, direction of arrival and time since transmission, the location and size of the reflecting object can be determined. Further, by measuring the fine detail of the reflected pulse, the shape and appearance of the reflecting object may be recreated.

While ultrasonic imaging devices work well, their use has been limited by the resolution of the transducer and by the magnitude of the emitted ultrasonic pulse. Accordingly, a need exists for an ultrasonic imaging system with a better resolution, and hence, range.

SUMMARY

An acoustic/video processing stack of a plurality of substantially identical acoustic/video processing stacks is provided for attachment to a processing stack backplane and which together generate a VGA signal for display of a three-dimensional acoustic image. The acoustic/video processing stack includes a two-dimensional array of transducer elements, a companion chip block coupled to and adapted to transceive acoustic signals under a time-division multiplexed format through the transducer elements and to provide a portion of the VGA signal together generated by the plurality of acoustic/video processing stacks and a backing block disposed between the two-dimensional array and companion chip block and adapted to acoustically isolate the two-dimensional transducer array from the companion chip block, said companion chip block and backing block being of a size and diameter substantially the same as the two-dimensional transducer array.

BRIEF DESCRIPTION OF THE DRAWINGS

FIG. 13 depicts a cluster element detail of the system of FIG. 2;

DETAILED DESCRIPTION OF A PREFERRED EMBODIMENT

Figure 1:
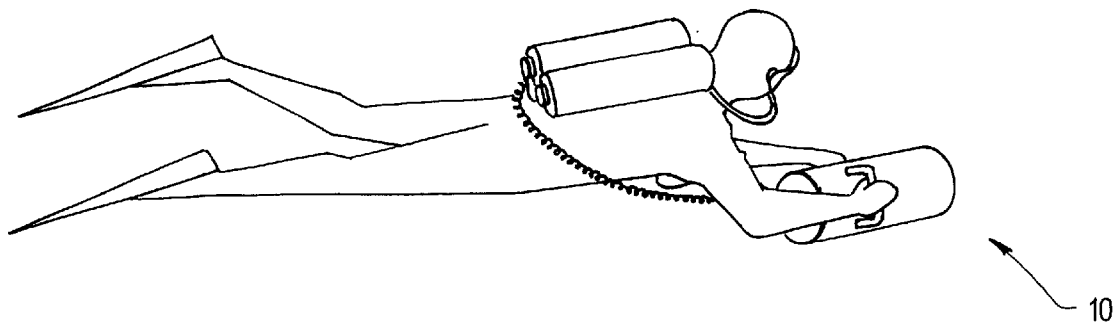
FIG. 1 depicts an acoustic video system in accordance with an illustrated embodiment of the invention in a context of use.

FIG. 1 depicts an ultrasonic imaging (i.e., sonar) system 10 in a context of use. The sonar 10 is illustrated in FIG. 1 as being convenient for use by a swimmer. A barrel-shaped housing of the system 10 roughly 6.7" in diameter by 15" long and displacing about 2 gallons of water is aimed by the swimmer at the object to be viewed. A small cable connects the sonar to a battery pack strapped to the swimmer and to a heads-up display on the swimmer's mask. The sonar acquires fully populated, three-dimensional data and displays it in a C-scan format. A whole image is acquired in 1/30th of a second at 30 frames per second (FPS) merely by pointing the sonar at the object of interest.

Figure 2:
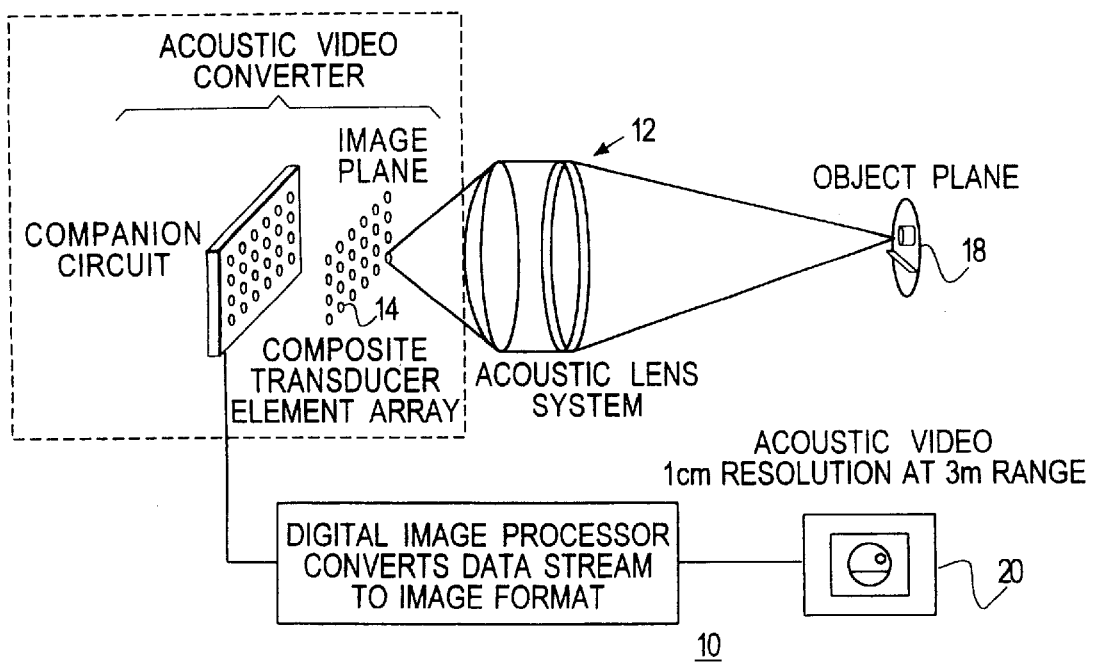
FIG. 2 is a functional block diagram of the system of FIG. 1.

A functional diagram of the sonar 10 is shown in FIG. 2. The sonar 10 includes a set of acoustic lenses 12 forming an image on the multi element focal plane transducer array 14 in the Acoustic Video Converter (AVC) 16. The AVC 16 converts the 3-D acoustic image to electronic signals which are processed to directly drive any VGA display 20, including developmental diver's mask heads-up displays. Individual transducer elements within the AVC both transmit and receive acoustic signals. On transmit, the signals propagate through the lenses 12 which focuses them on corresponding elements 18 in the object plane. Reflecting from the object plane 18, the acoustic echoes pass through the same acoustic lenses 12 and are focused on the focal plane transducer array 14 in the AVC 16. Using a monostatic form of transmit-receive through the lenses substantially improves sonar performance by increasing angular resolution and reducing sidelobes. This sonar 10 provides 3-D image data as contrasted to 2-D images provided by prior-art diver-held sonars.

A set of specifications, tabulated in Tables I and II, summarize the attributes of both the lens and AVC developments. Elements in the AVC form an approximately circular array in the image plane. The roughly 8000-element array is about 100 elements across. All element-level signal processing, including analog-to-digital conversion, is contained in the array. The goal is to perform all digital image processing within the sonar so that it can be interfaced directly to a VGA display 18.

TABLE I

| Array Size | 100 element diameter quasi-circular array |
|---|---|
| Element Size | 1 mm diameter |
| Element Spacing | 1.4 mm center to center |
| Center Frequency | 3 MHZ +/− 10% |
| Transmit | 150 dB above 1 $\mu$Pascal/V @ 1 meter |
| Receive | −215 dB relative to 1 V/1 $\mu$Pascal @ 1 meter |
| Transmit Voltage | 30 Vrms (100 Vp-p) |
| Transmit Burst Length | 13 $\mu$s or 6.5 $\mu$s |
| Cross Talk | <40 dB |
| Shutter Speed | <1/50 second |
| Frame Rate | Minimum 10/second, maximum 30/second |

TABLE II

| Resolution | <1 cm range at 3 meters range, <1 cm cross range at 3 meters range |
|---|---|
| Receiver Dynamic Range | 50 dB (instantaneous) |
| Nominal Minimum Signal | 1.6 $\mu$Vrms |
| Signal Bandwidth | 75 kHz or 150 kHz |
| Receiver Functions | Detect first peak above threshold, Time to first peak above threshold |
| Threshold | Diver sets value |
| System Dry Weight | 16 lb. (not including batteries) |
| System Buoyancy | 1 lb. |
| AVC Power Dissipation | ·15 W |
| System Volume | 0.3 ft$^3$ |
| Mission Life | 2 hours minimum, 4 hours goal |
| Operating Depth | 300 feet |

The acoustic lenses of the AVC system 16 is designed to resolve 1–2 cm in range and cross range at a range of 1–5 meters. The AVC has been designed to operate well below the diffraction limit of the lens system 12. All element-level signal processing is performed by a companion chip, which has been designed to mount in a single plane parallel to the image plane and within the foot print of the transducer elements themselves. The companion chips must also consume sufficiently low power to support a two-to-four hour mission with reasonable batteries. Details on the lens system, transducer elements, AVC, and companion chip follow.

The system configuration and lenses will be discussed first. A lens-based imaging system has been developed for this application. A multi-element planar array of transducers 14 with 1.4 mm pitch are placed in the focal plane. Each element in the array is used independently for transmitting and receiving. Approximately 8000 transducer elements in a circular format provide a 20° conical field of view with 0.2° angular resolution. The system was designed to operate at three different frequencies in the 3 MHz range and to view objects 1 to 5 meters from the diver. Transmitted pulse length with be 13 microseconds to give a 1 cm range resolution.

Figure 3:
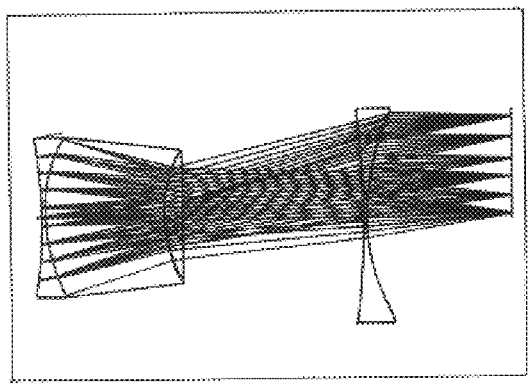
FIG. 3 depicts a lens system of the system of FIG. 2.
Figure 4:
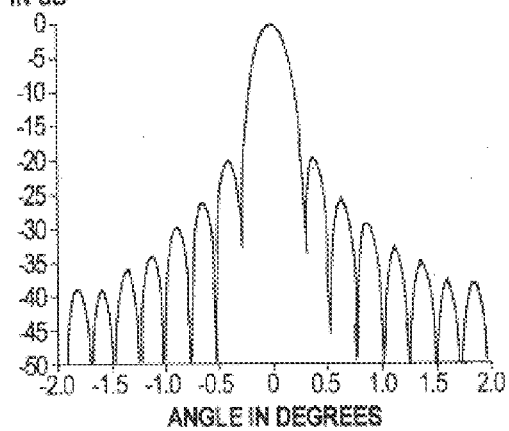
FIG. 4 depicts a computed beampattern of the system of FIG. 2.
Figure 5:
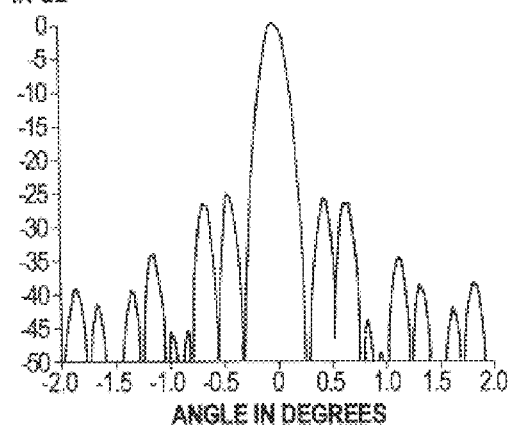
FIG. 5 depicts an alternate computed beampattern of the system of FIG. 2.
Figure 6:
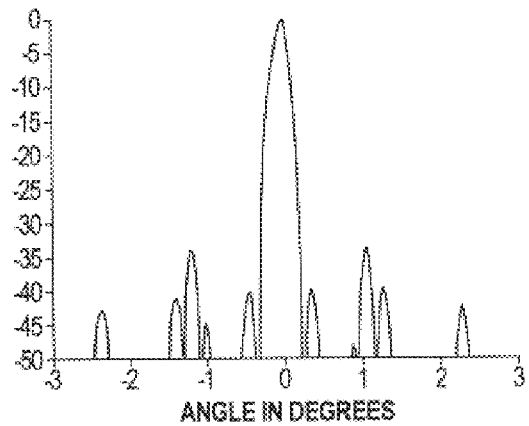
FIG. 6 depicts a third alternate computed beampattern of the system of FIG. 2 in degrees.

A ray diagram of the f/3.4 multi-element lens system 12 designed for this application is shown in FIG. 3. This figure shows rays from 0 to 10 degrees off-axis entering from the left being focused on the retina at the right. A biconcave lens element 12 cm in diameter is separated from the 10 cm diameter plano-convex element by the liquid Fluorolube FS-5. The front two lens elements and the 16 cm diameter rear lens element were fabricated from the material polymethylpentene (PMP). The large diameter of the rear lens used as a "field flattener" was dictated by the requirement for a planar 14 cm diameter retina array. The lens system was driven by retina size, which in turn is determined by the acoustic sensor element spacing and field of view. For this system the center-to-center spacing of transducer sensors was 1.4 mm, or 0.2° based on lens system focal length of 41 cm. The computed single beam transmit beampattern shown in FIG. 4 has a −3 dB beamwidth of 0.28°. When retina elements are configured in a 3 by 3 frequency-time multiplex arrangement, the beampattern is modified as shown in FIG. 5. In this configuration every third element in a retina array row operates at the same frequency (e.g., 3.0 MHz) while the two intermediate elements operate at different frequencies (e.g., 2.7 MHz and 3.3 MHz). Array columns are similarly arranged so that with three transmission cycles a complete image frame is formed. Adjacent elements in each row are separated in frequency, and array columns are separated by the time for one transmit-receive cycle. In this way, adjacent elements form independent beams without coherently interfering with a next neighbor. It is possible to improve sidelobe levels by using a 6 by 6 frequency-time multiplexing configuration which will yield composite transmit-receive beampatterns as shown in FIG. 6.

The basic designs of this lens system has been achieved using commercial optical lens design software with modified glass catalogs to encompass acoustic refractive indices of plastics and liquids. Commercial lens design tools offer a number of analytical tools for judging lens performance. Among these are plots of "optical" path difference, spot diagrams (ray intercepts with retina), modulation transfer functions, etc. For detailed diffraction pattern and lens system gain performance assessment it is necessary to use software that includes effects of acoustic attenuation and impedance of the lens materials, and sensor dimensions. Proprietary software used in this study is based on ray tracing and has been verified many times for wavelengths from 5 cm to 0.05 cm and lens systems up to 1.0 meter in diameter containing as many as 7 refractive elements.

The lens surfaces used in this design were aspheric, or sections of conic surfaces. In optics, diffraction limited performance is not always required and ashpheric surfaces are often avoided due to increased cost of fabrication. At ultrasonic wavelengths discussed here (0.05 cm), diffraction limited performance is always required, but due to the precision of numerically controlled machining tools, fabrication costs are not significantly increased regardless of surface form.

In the past, lens systems have been criticized because lens focal length varied with temperature and salinity. It has been found possible to design lens systems with a constant focal length over a large range of temperature and salinity, typically 5° to 25° C. and 0 to 35 ppm salinity. To date, lens systems designed in this manner require a combination of a high refractive index liquid and multiple solid elements such as that shown in FIG. 3. These lenses are the acoustic analog of the achromat lens in optics. Lenses have been developed with reduced f-numbers with relatively constant focal length over the range of temperature and salinity variations found in seawater. Internal reflections within the lens have been noted in experimental systems; however, with the use of materials such as PMP with good impedance match to seawater, reflection levels can be reduced to acceptable levels (e.g., less than −20 dB). Models have also been developed for accurately predicting levels of internal reflection.

Figure 7:
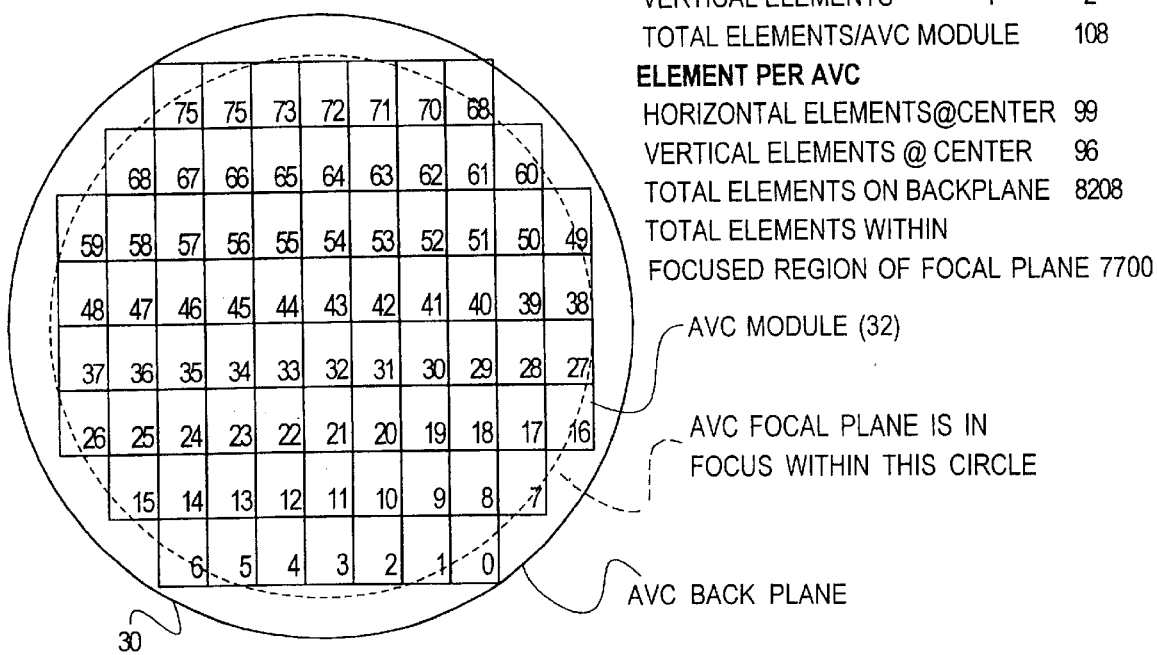
FIG. 7 depicts a transducer array of the system of FIG. 2.

The acoustic video converter (AVC) will be discussed next. The AVC 16 is the acoustic analogue of an optical retina, that is a two-dimensional array of transducer elements 14 operating with a focusing lens system to generate images. This array, however, is designed to not only to receive, but also generate individual quasi-CW sound waves. The array, consisting of 8028 elements, operates at frequencies between 2.7 to 3.3 MHz, is focused at 1–5 meters by an acoustic lens system, and receives echoes that are focused again by the lens system back onto the array elements. Integrated transceiver electronics mounted onto the back of the array both provide the necessary excitation voltages to drive the elements as well as amplifiers, filters, and peak detectors for the received signals. Only the received echo amplitudes are required to be detected. Each 1.0 mm diameter element of the array addresses a specific point in image space with 0.2° beamwidth. The configuration of the AVC 16 is shown in FIG. 7 whereby the overall aperture is assembled from 76 modules 32.

Each AVC module 32 contains 108 elements in a 9×12 array, plus a transmit/receive switching mechanism, and all of the signal conditioning to reduce the data from each transducer element to a single digital word. The AVC backplane 30 is a printed wiring board which provides high voltage transmit waveforms and digital control data to the AVC module 32 and routes digital signal data from AVC modules to a digital image processor and VGA display.

Figure 8:
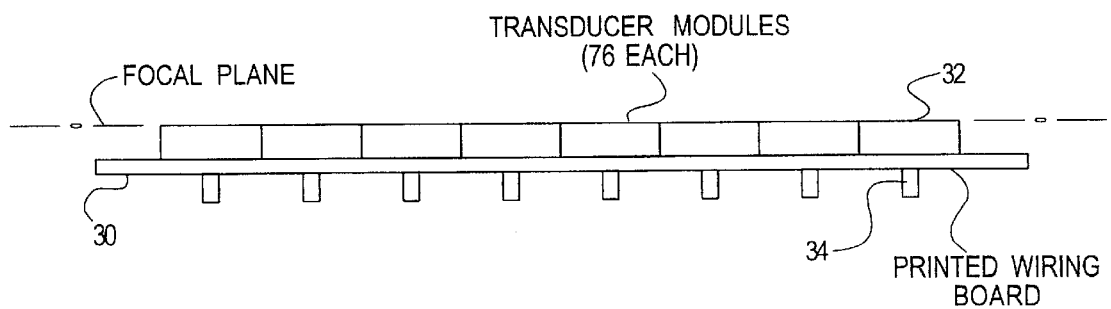
FIG. 8 is a side view of the array of FIG. 7.
Figure 9:
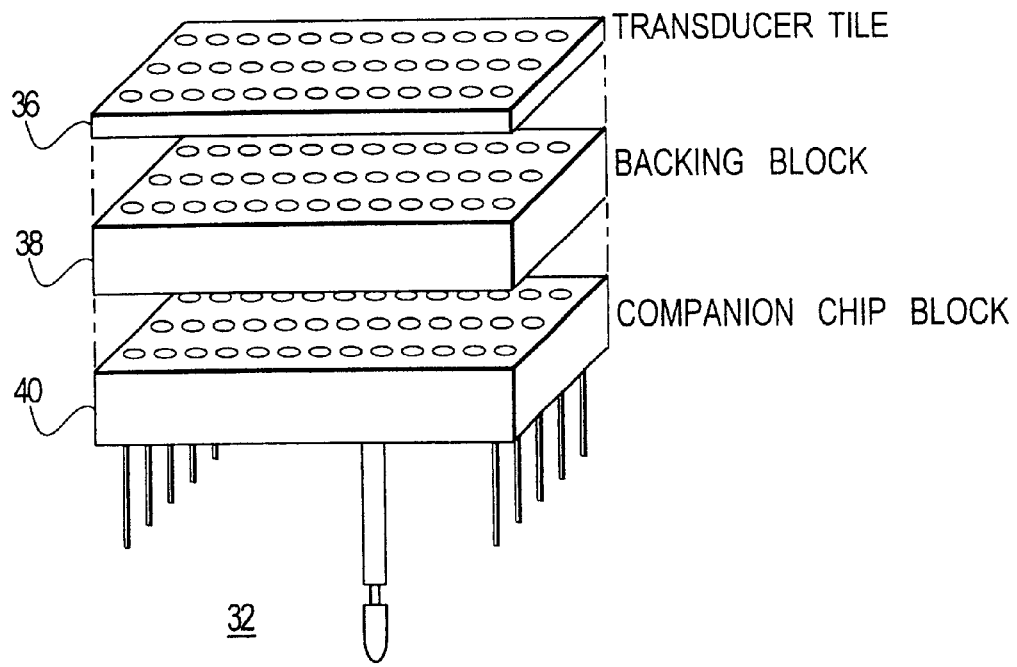
FIG. 9 is a AVC module of the array of FIG. 8.

The AVC modules (labeled 0–76 in FIG. 7) are assembled on a printed circuit board 30. FIG. 8 is a view from an edge of the AVC assembly showing modules mounted on AVC backplane 30. AVC modules 32 are aligned with each other and retained in place with a pin (e.g., 34) that extends throughout the AVC board 30. Each AVC module 32 is constructed from the three major components, shown in FIG. 9. The transducer tile 36 contains 108 transducer elements plus electrical contacts to both sides of each element. The backing block 38 provides 216 (180×2) electrical paths between the transducer tile 36 and the companion chip block 40 and absorbs sound to mitigate acoustic crosstalk among transducer elements. The companion chip block 40 provides transmit/receive switching, processes and multiplexes received signals, and interfaces to the AVC backplane 30. The transducer tiles 36 and backing block 38 will be addressed in later sections. The companion chip block 40 will also be discussed in later sections.

Figure 10:
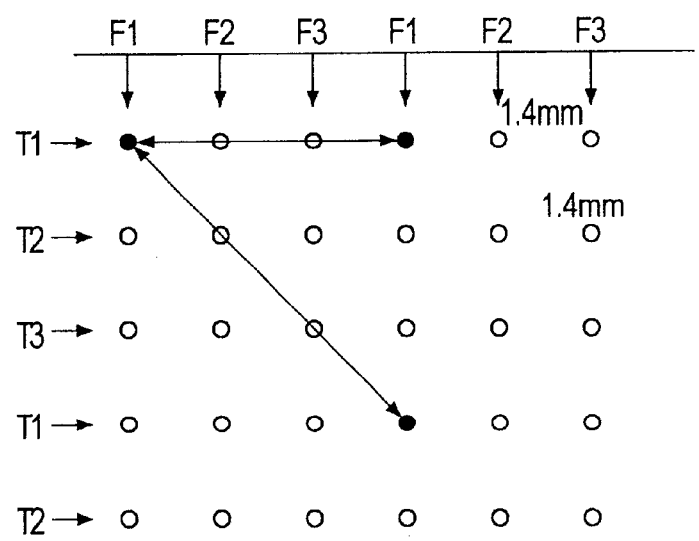
FIG. 10 depicts time/frequency division multiplexing that may be used by the system of FIG. 2.

Both time and frequency multiplexing is employed in AVC 16 to reduce crosstalk among transducer elements. A scheme using three different transmit/receive subcycles is diagrammed in FIG. 10. At time T1, all the element rows labeled T1, transmit then receive. Note that all three frequencies (F1, F2, and F3) are transmitted and then received at the same time. At time T2 and time T3, all elements in rows T2 and T3 (respectively) transmit and then receive. For each receiver, the companion chip blocks two of the frequencies and passes the one of interest. Therefore, the nearest individual elements (operating at the same time and frequency) are physically three element spacings away. This physical separation provides an opportunity to reduce crosstalk due to sidelobes and acoustic propagation.

Figure 11:
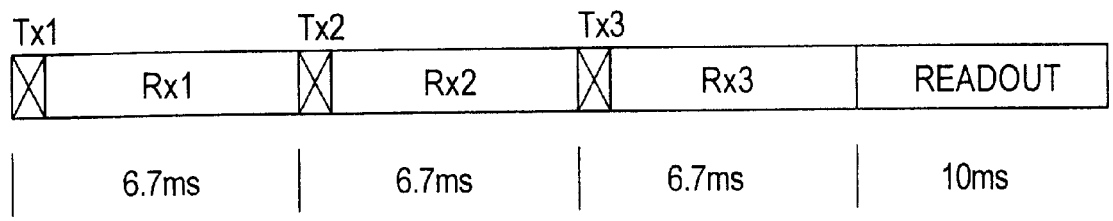
FIG. 11 depicts a data acquisition cycle of the system of FIG. 2.

The data acquisition cycle for a complete frame is plotted in FIG. 11. Each transmit/receive (Ts/Rx) cycle will be completed in 6.7 ms, and all data will be read out of the AVC in 10 ms. A complete frame will be acquired in 30 ms, supporting a frame rate of 30 frames/second. The image is acquired during the period T1+T2+T3 in 20 ms. Thus the shutter speed is ⅕₀th of a second.

Figure 12:
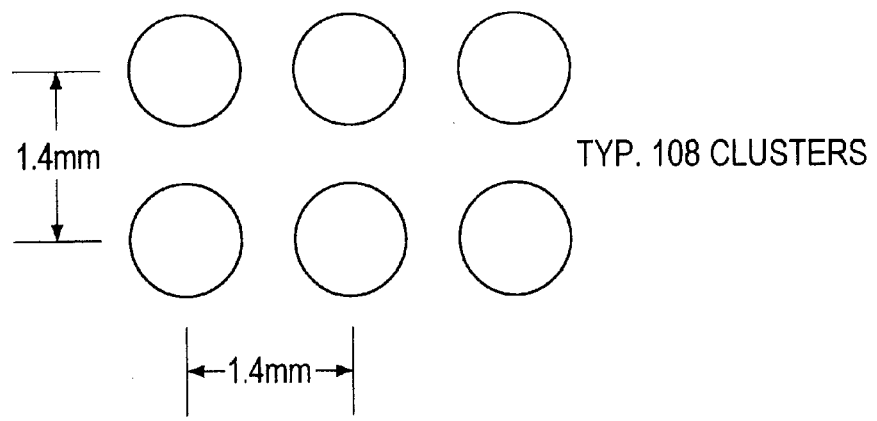
FIG. 12 depicts a cluster grid pattern that may be used within the system of FIG. 2.

The transducer array will be discussed next. Several conceptual designs of the transducer array were proposed and considered. The array design consists of 1 mm diameter elements spaced on a square grid of spacing 1.4 mm, as shown in FIG. 12. Each array element is further divided into a 1–3 piezocomposite of seven individual ceramic rods of nominal diameter 0.28 mm spaced with six rods evenly distributed around one central rod, all embedded in a polymer matrix (see FIG. 13). This cluster element configuration was chosen in order to achieve excellent acoustic vibration characteristics with a maximum volume of ceramic material. Composite acoustic tiles consisting of 9×12 individual cluster elements are manufactured using injection-molded composite of Morgan Matroc PZT5H ceramic with a soft urethane filter, all provided by Materials Systems, Inc. of Littleton, Mass. Each acoustic tile is coupled to its companion ASIC chip with a backing block providing individual hot and signal return leads for each cluster element. Nominal 1.0 mm diameter matching layers are applied onto each cluster element on the front of the acoustic tile with a thin metallic tab extending to individual signal return points. The thickness of these matching layer caps is approximately ¼ wavelength in order to achieve sufficient bandwidth to operate the tile from 2.7 to 3.3 MHz, provide improved beam profiles achieved with more piston-like displacement, and increase sensitivity. The AVC will be made of 76 individual AVC modules consisting of 108 (9×12) element acoustic tiles with matching layers, backing block, companion chip, and carrier.

Figure 14:
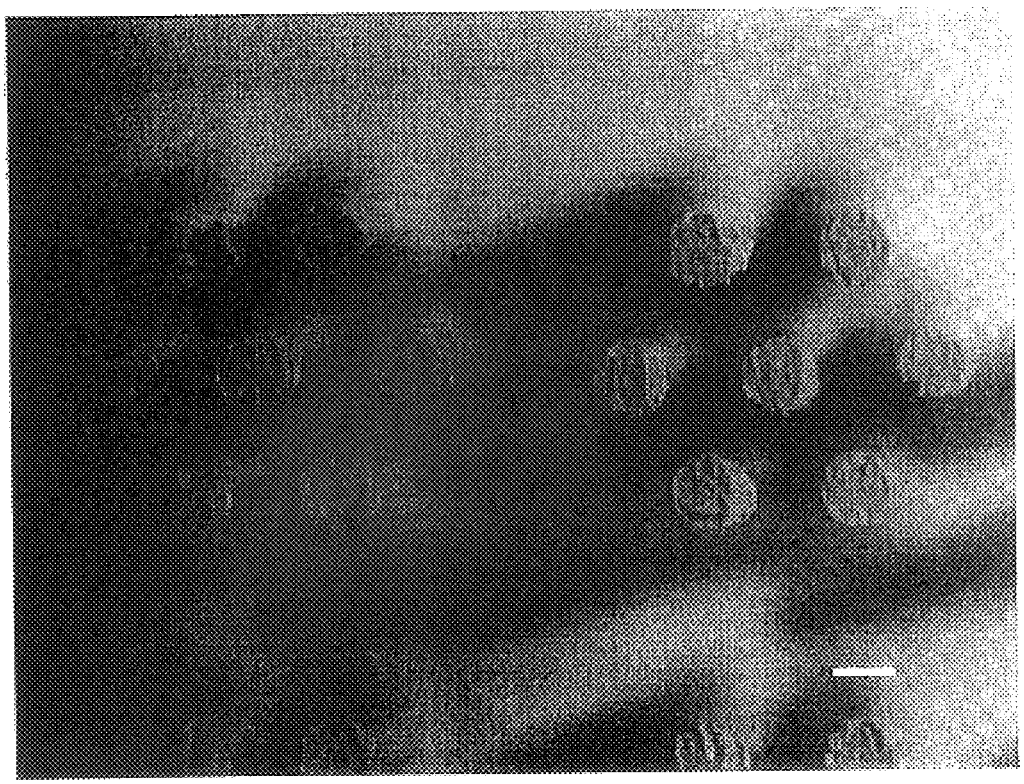
FIG. 14 depicts molded cluster elements that may be used by the system of FIG. 2.

There are a number of significant issues that were considered in order to confirm the viability of the AVC 16. Very few two-dimensional ultrasonic transducer arrays have been attempted to be constructed, especially with as many as 8208 elements operating at this high a frequency. Most of these arrays have used low sensitivity piezoelectric polymers bonded to silicon substrates as a receive only array, and these have met with limited success. The high transmit efficiency and high sensitivity required in this system can be met simultaneously only with high coupling coefficient, low loss piezoelectric ceramics. The present state-of-the-art in linear array manufacture is to use modified semiconductor dicing saws to dice solid ceramic materials into the isolated elements required. While this technology can be employed in the AVC, it is limited to square elements spaced in a rectangular pattern. The new technology based on injection molding of ceramics has been recently developed by Materials Systems, Inc. This technology is potentially simpler, cheaper, and more versatile than the dicing saw technology. Two molded ceramic cluster elements are shown in FIG. 14.

The amount of electrical and acoustic crosstalk in the array is of critical importance in order to achieve sufficient inter-element isolation. An array with a solid composite piezoelectric material with a continuous ground plane and undiced matching layer is straightforward to design and construct, and has crosstalk levels on the order of –30 dB. This level is unacceptable, however. Acceptable crosstalk levels were achieved in the array using specially developed polymers and backing materials in proprietary geometries as described herein.

The acoustics and basic construction techniques of building the AVC are only part of the issues. Making electrical connection to each of 8208 elements through an acoustic backing to custom ASIC's mounted on its back face is probably the most difficult problem to solve. Several techniques have been developed for making separate ground connections through the acoustic tile itself.

The tile is bonded to an acoustically isolating backing block which also passes all 216 leads through to the backside of the block as mentioned above. A matrix of pads on each side of the backing block is precisely aligned with the cluster elements and individual signal return pads on the back side of the acoustic tile. The backing is then bonded to the tile using well-known thin-bonding techniques, forming the acoustic sub-system. Electrical connection is made by ohmic contact, a technique used by several medical ultrasound transducer manufacturers. Precise alignment is required to make all 216 connections successfully. The backside of the acoustic subsystem is mated with a multilayer PCB which routes the element hot and signal return lead pads to connections on the custom ASIC.

Figure 15:
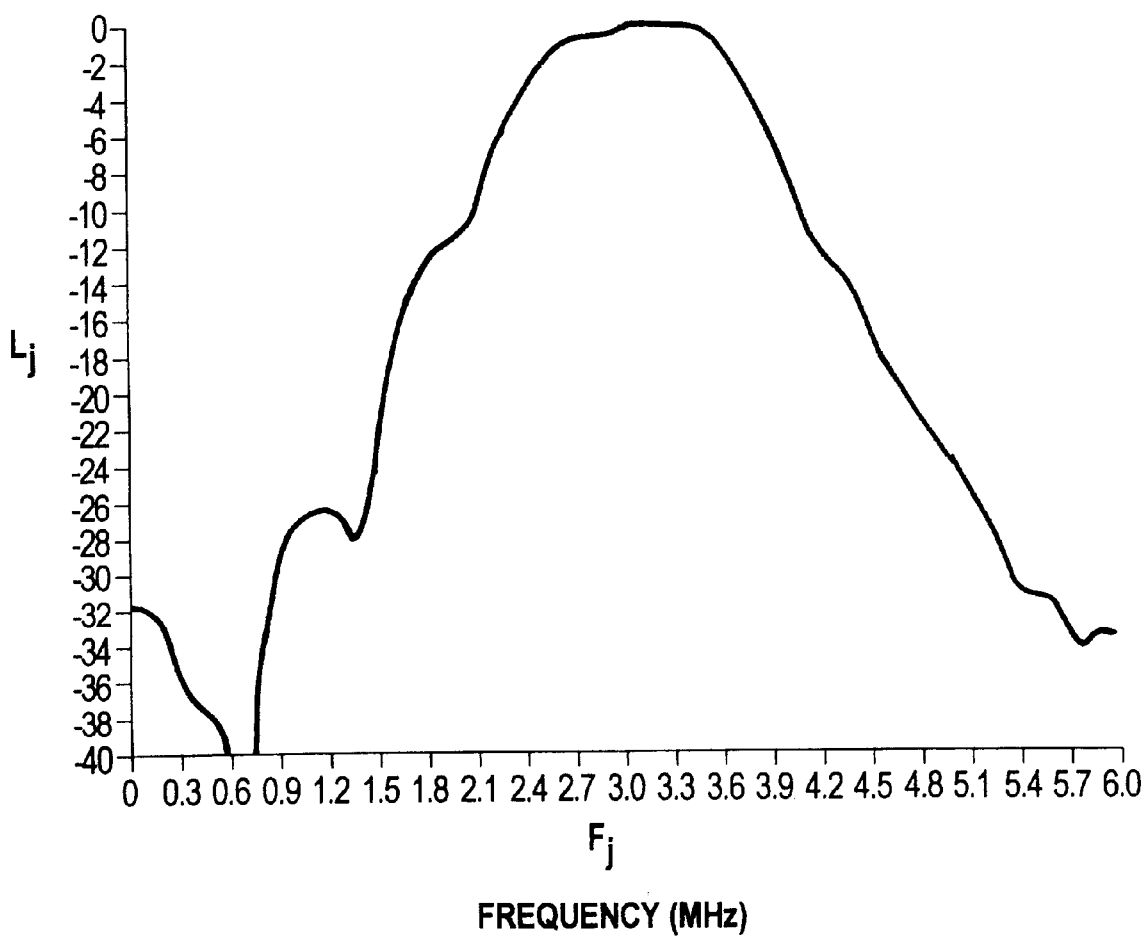
FIG. 15 depicts a demonstration prototype element frequency response of the system of FIG. 2.
Figure 16:
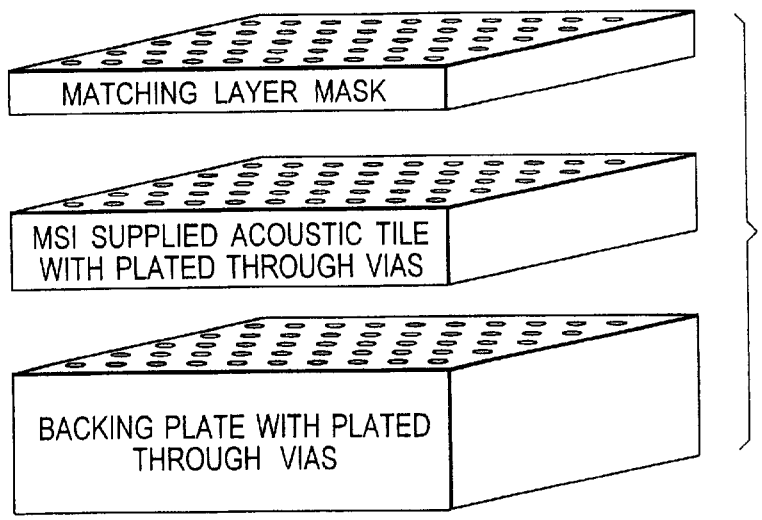
FIG. 16 depicts an acoustic stack subsystem of FIG. 2.

Significant progress has been made to date in developing the acoustic stack modules, consisting of acoustic tile and backing. Fully dense 10×10 element tiles on the original 1.75 mm spacing were manufactured by MSI using a relatively stiff polymer filler. Fully functional test arrays were built with matching layer caps, continuous front electrode, row by row flex circuit interconnects, and cast-in-place backing. The elements were characterized electrically and acoustically. Bandwidths of 52% centered at 3.1 MHz were achieved with uniform characteristics from element to element as well as 100% connectivity. This can be seen in FIG. 15. Crosstalk levels were below –40 dB for the second nearest neighbor which are much better than required.

A second series of test arrays on 1.75 mm spacing were manufactured using a PCB backing block mass terminated to the tile. 97% of the elements were successfully connected in this manner, demonstrating the efficacy of mass termination.

Figure 17:
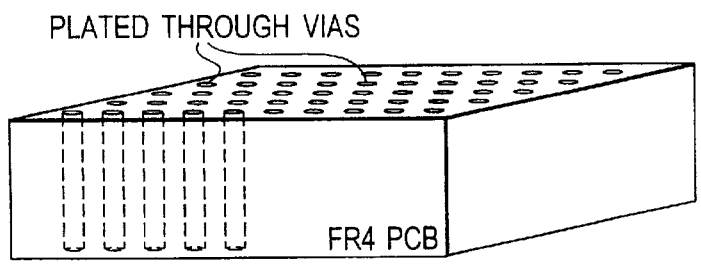
FIG. 17 depicts a FR4 backing block that may be used by the system of FIG. 2.
Figure 18:
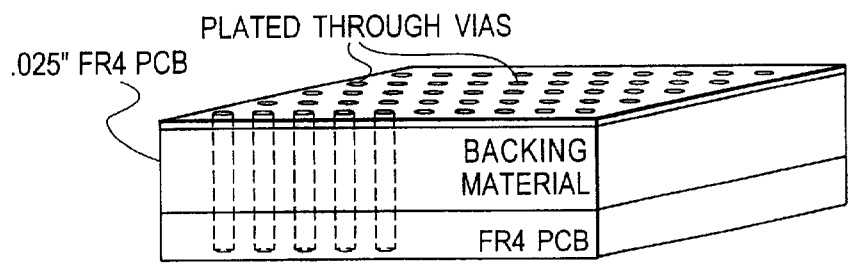
FIG. 18 depicts a sandwich backing block that may be used by the system of FIG. 2.
Figure 19:
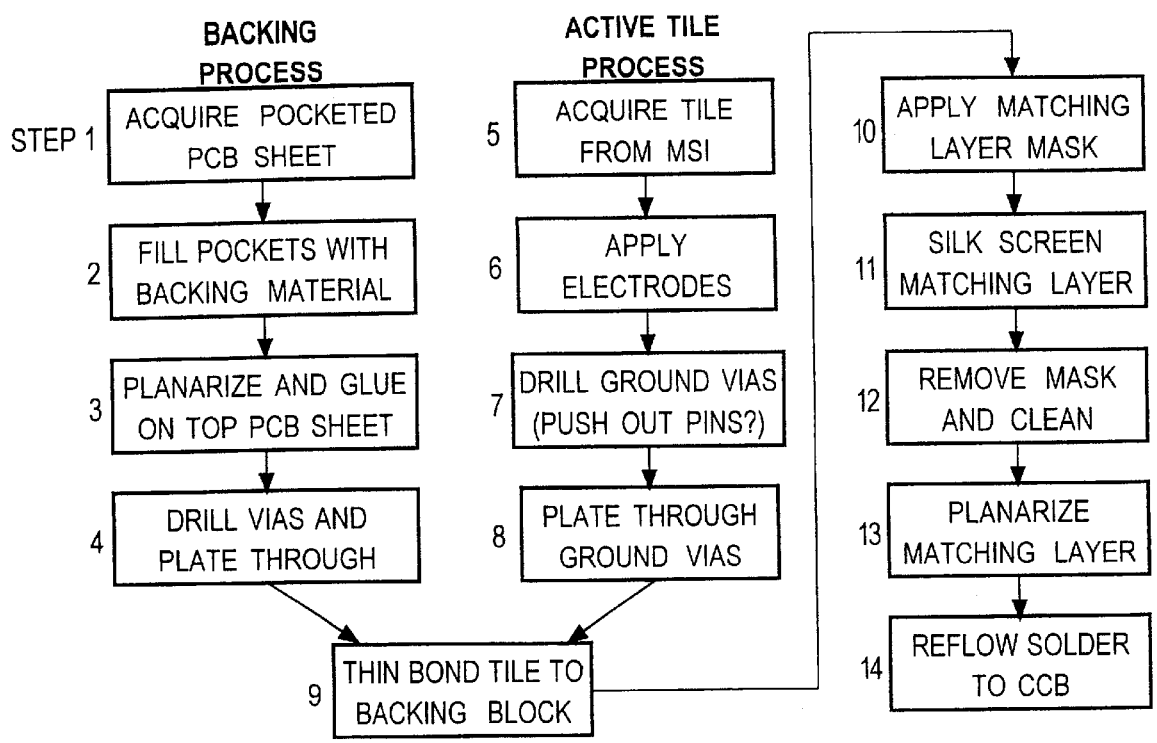
FIG. 19 depicts an AVC acoustic stack flow process that may be used in making the AVC modules used within the system of FIG. 2.

The acoustic stack sub-module design shown in FIG. is based upon a 9×12 tile array of elements on 1.4 mm centers with plated through vias. An approximately quarter-wavelength matching layer above (toward the lens system) the tile, and a backing block below (toward the companion chip block) to attenuate acoustic signals complete the acoustic stack. Both a solid FR4 backing block (FIG. 17) and a sandwich backing block (FIG. 18) are considered practical including traditional acoustic backing material sandwiched between two FR4 boards. A process flow for assembling the acoustic stack sub-module is shown in FIG. 19.

The companion chip block 40 will be discussed next. The companion chip block (CCB) comprises the companion chip itself, contacts to the backing block and the AVC backplane, and a means of aligning it with, retaining it to, and extracting from the AVC backplane. Its mechanical assembly and electrical circuitry are discussed in the following subsections.

Figure 20:
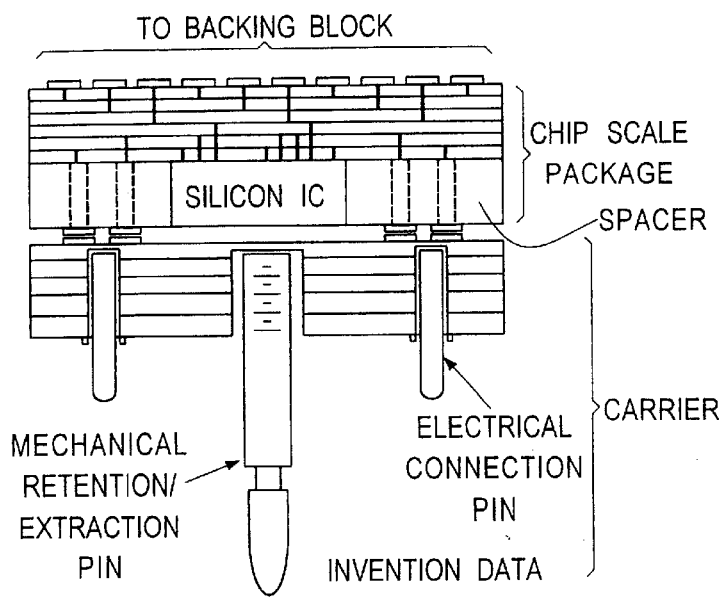
FIG. 20 depicts a companion chip block that may be used within the system of FIG. 2.

A cross section of the preliminary design for the companion chip block (CCB) is shown in FIG. 20. The companion chip is encased in a chip scale package that provides 216 contacts to the backing block (and ultimately the transducer tile). On the opposite face of the chip scale package, 32 contacts mate with a carrier. The carrier connects these contacts to conventional electrical pins used in electronic plug-in modules. A mechanical retention/extraction pin aligns the carrier, CCB, and transducer module with the AVC backplane. In addition, it holds the module to the backplane and provides a means of extracting it without touching the transducer tile.

Figure 21:
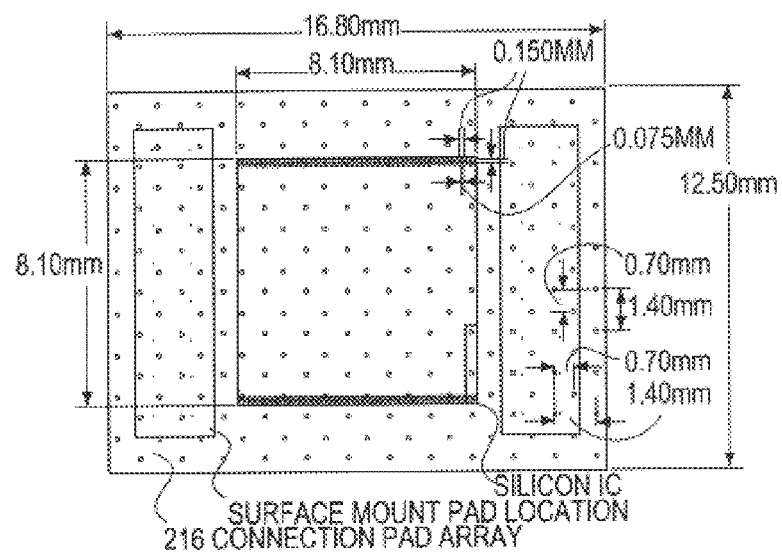
FIG. 21 depicts a chip scale package that may be used within the system of FIG. 2.
Figure 22:
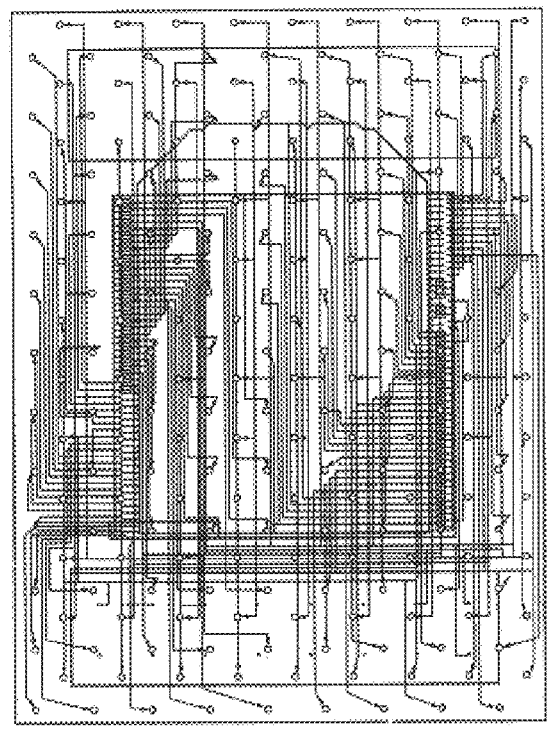
FIG. 22 depicts a chip scale package layer composite that may be used within the system of FIG. 2.

The CCB assembly 40 was designed and manufactured using Chip Scale Package (CSP) technology. A rectangular spacer surrounds the silicon IC and contains vias to connect upper wiring layers with the pads for the carrier. Wiring layers above the IC connect the IC to external pads. A preliminary layout of the package is shown in FIG. 21. The silicon IC is in the center of the package, with two, double rows of tightly packed bonding pads. A uniform array of 216 pads aligns with the backing block. Two groups of two rows of eight pads (2×(2×8)=32) labeled surface mounted pad locations will mate through the spacer with the carrier. The fine layers of wiring shown in FIG. 22 yield a manageable package that is inexpensive to produce.

The CCB carrier is currently envisioned as a small printed wiring board (see FIG. 20). Off-the-shelf 15 contact pins are inserted and soldered with a high-temperature solder. A retention pin (possibly custom) is also soldered into the board. Finally, the chip scale package is soldered to the board with a lower temperature solder using surface-mount technology.

The actual connection of the CCB carrier will be discussed in detail next. The companion chip block (FIG. 21) includes a silicon IC with maximum dimensions of 8×8 mm. A solderable 216 connection pad array on one 12.6 mm×16.8 mm surface of the companion chip block mates with a 9×12 backing block. 108 connections are made between the 216 connection pad array and the silicon IC receive inputs. A low resistance ground connection is also made to each of the silicon IC channel amps. The companion chip block provides pads on the side opposite the 216 connection pad array for mounting the pin sub block. Two groups of 14 pads each are located on each of two opposing edges of the chip. Nine pads from these connectors are used to connect the nine transmit lines from the back plane. The nine transmit lines connect to the 216 pad array in a total of 108 places. An additional 19 connections will be provided between the surface mount connectors and the silicon IC to provide power, ground, clock and output.

Die dimensions along the channel amp input side of FIG. 21 is 8.1 mm plus the minimum spacing required for seal ring and scribe lines. This dimension is determined by 54 pads on a 0.15 mm pitch. This 0.15 pitch is required to satisfy the 75 micron minimum line pitch currently available in this technology. Die dimension on remaining sides is at least 4 mm, but no more than 8.1 mm. The assumed dimension for the preliminary layout was 8.1 mm. Based upon the result of the layout, it is believed that a more narrow IC in this dimension could be accommodated simply by routing more of the connections out as opposed to in.

The input pins of the IC are located along two opposing edges of the die. 54 pins are provided on each side and include 100 micron bond pads on 150 micron pitch spacing.

Ground connections are located along the same two sides as the input pins on a row of pads internal to the input pins. The ground connections are provided with 100 micron bond pads on 150 micron pitch spacing, as shown in FIG. 21. Note that the effective pitch of each pair of rows is 75 microns. To improve yield it may be desirable to reduce the number of ground connections, however, the full number of connections is manufacturable so that the electrical design should not be significantly compromised in order to reduce the number of ground connections.

An additional 38 IC connections are provided. The additional 38 connections may be provided along the remaining two sides or distributed across the IC.

The overall size of the companion chip block may be slightly less than the 12.6 mm×16.8 mm shown. The backing block connection pads may be arranged as shown in FIG. 21.

Figure 32:
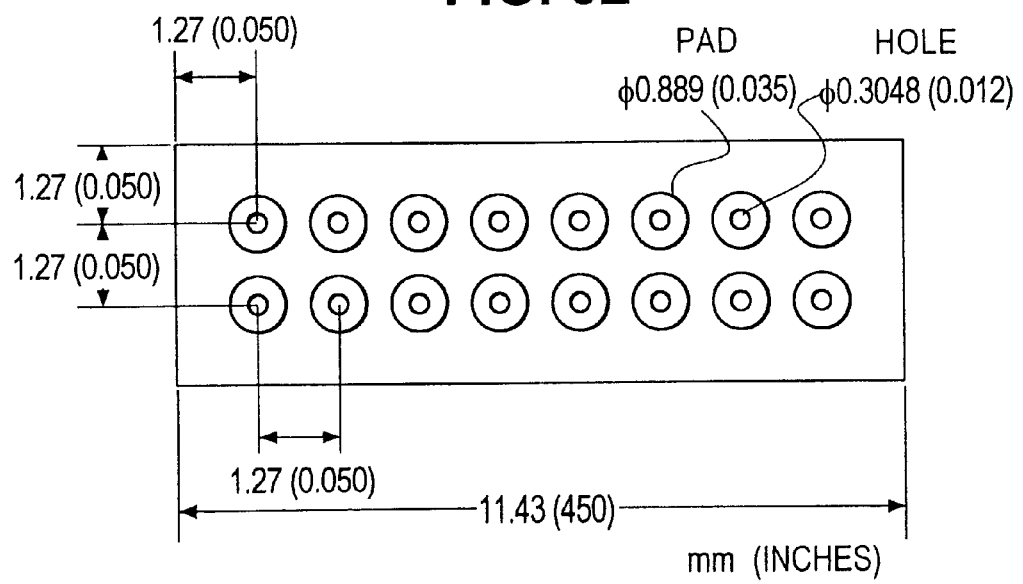
FIG. 32 depicts details of a sub block connection of a circuit board used by the system of FIG. 2.

FIG. 21 also illustrates the position of the silicon IC and pin sub block connection pads. FIG. 32 illustrates the details of the pin sub block connection pads. These pads may be fabricated as part of a conventional plated through hole printed circuit board. The printed circuit board may be placed on the alignment carrier at the same time as the silicon IC. One surface of the printed circuit board may be exposed to provide a surface for mounting the pin sub block.

Figure 33:
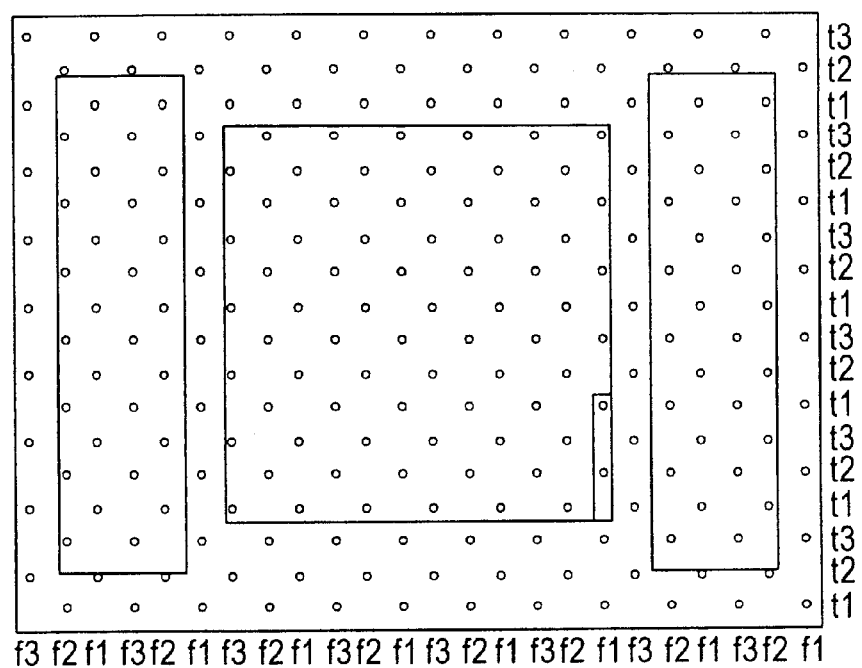
FIG. 33 depicts a top view of the CCB circuit board of the system of FIG. 2.

The distribution of the transmit and receive signal lines will be discussed next. FIG. 33 shows the CCB viewed from above onto the tops of the IC and 216 pad array. The array is arranged with twelve frequency columns and nine, time division multiplexing rows including three frequencies and three time slots for a total of nine combinations of frequency and time. The nine transmit lines may then be conveniently bussed along the short array side (where the surface mount connectors are located) and bussed to the transducer cells (elements) as indicated by the indices in FIG. 33.

Figure 34:
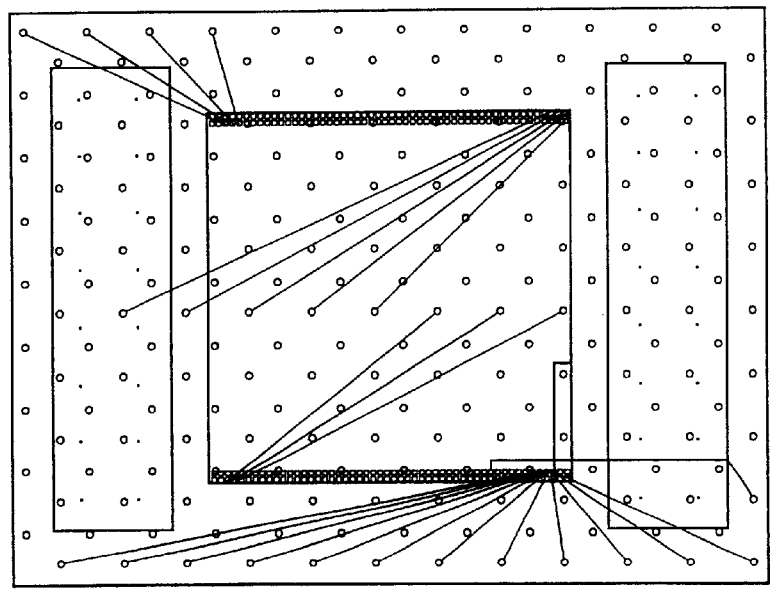
FIG. 34 depicts a circuit board connection scheme used by the system of FIG. 2.

FIG. 34 illustrates the connection scheme between the IC receive pads and the transducer pads. Some of the connections are removed for clarity. The connection starts from the lower right IC, which is connected to the lower right transducer pad. The connections then proceed by stepping from right to left on both the IC pads and the transducer pads. When the left most pad of the transducer pad array is reached, the next connection is made to the right most pad of the next row up on the transducer pad array. When the left most pad of the bottom row of IC pads is reached, the next connection is made to the right most pad of the top row up of IC pads as illustrated. Connections then proceed until the upper left IC pad is connected to the upper left transducer pad.

Figure 35:
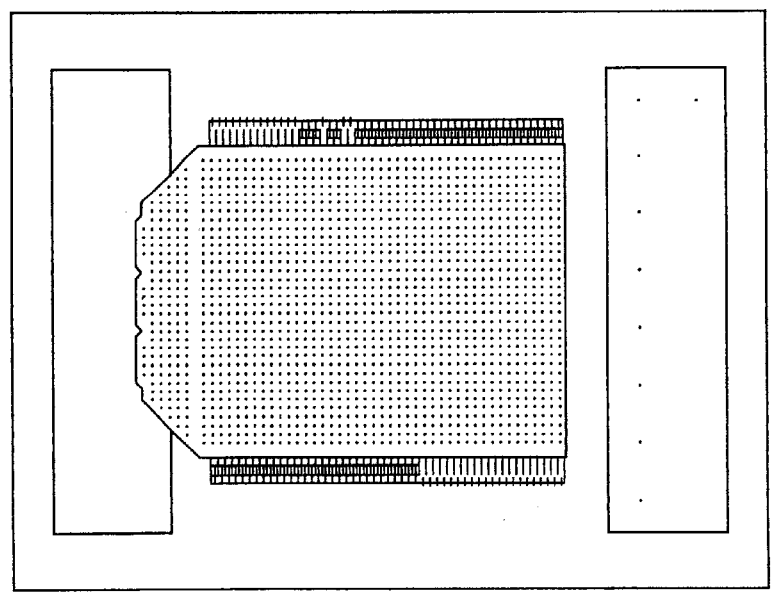
FIG. 35 depicts a first metallization layer of a circuit board used by the system of FIG. 2.
Figure 36:
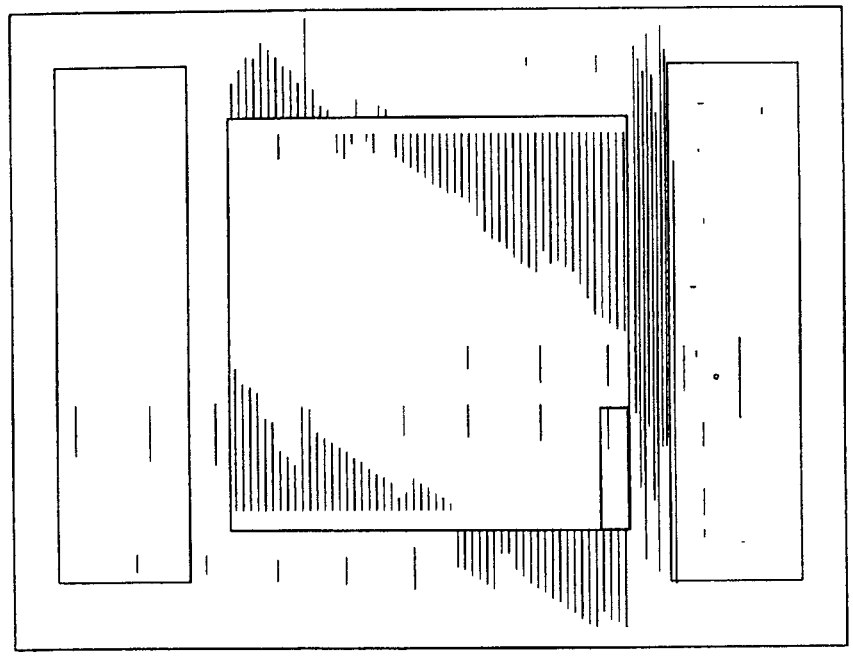
FIG. 36 depicts a second metallization layer of a circuit board used by the system of FIG. 2.
Figure 37:
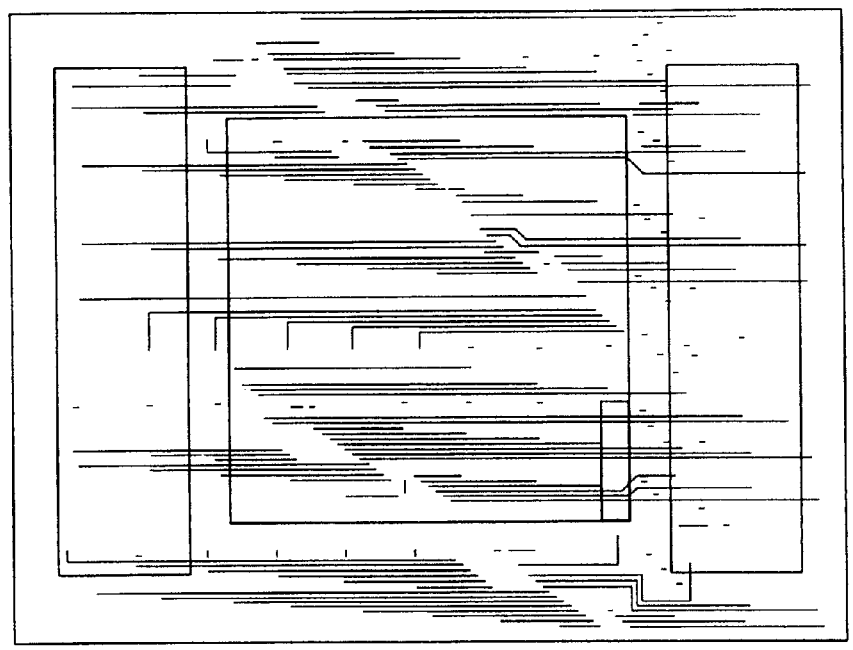
FIG. 37 depicts a third metallization layer of a circuit board used by the system of FIG. 2.
Figure 38:
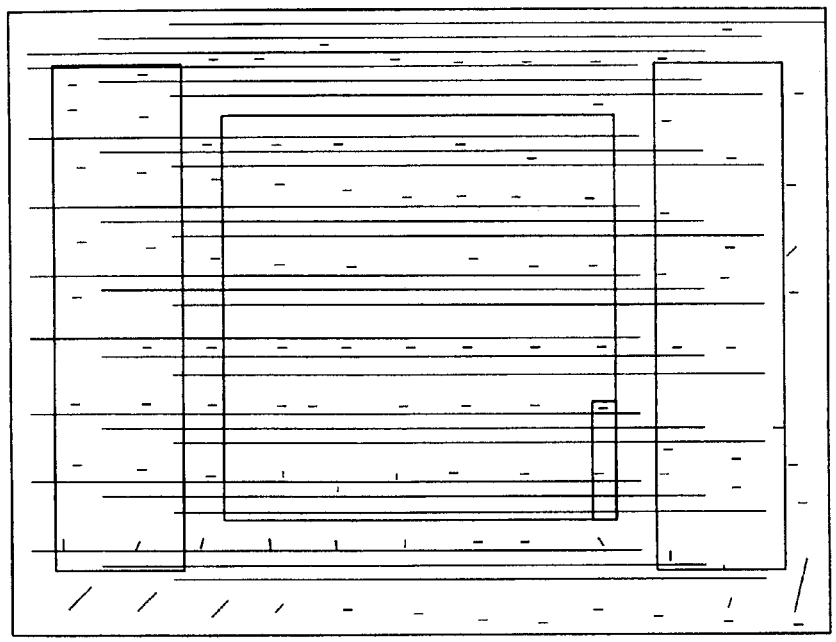
FIG. 38 depicts a fourth metallization layer of a circuit board used by the system of FIG. 2.
Figure 39:
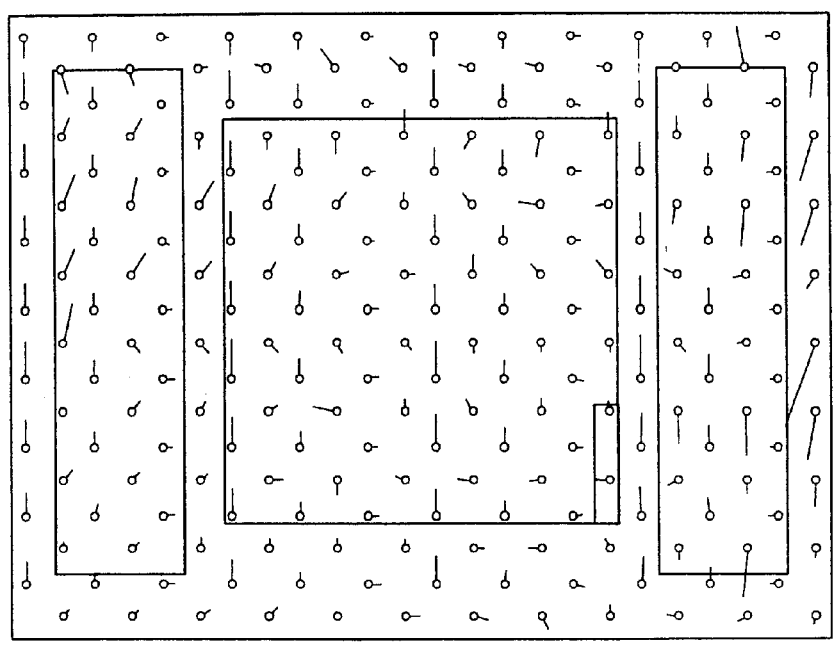
FIG. 39 depicts a fifth metallization layer of a circuit board used by the system of FIG. 2.
Figure 40:
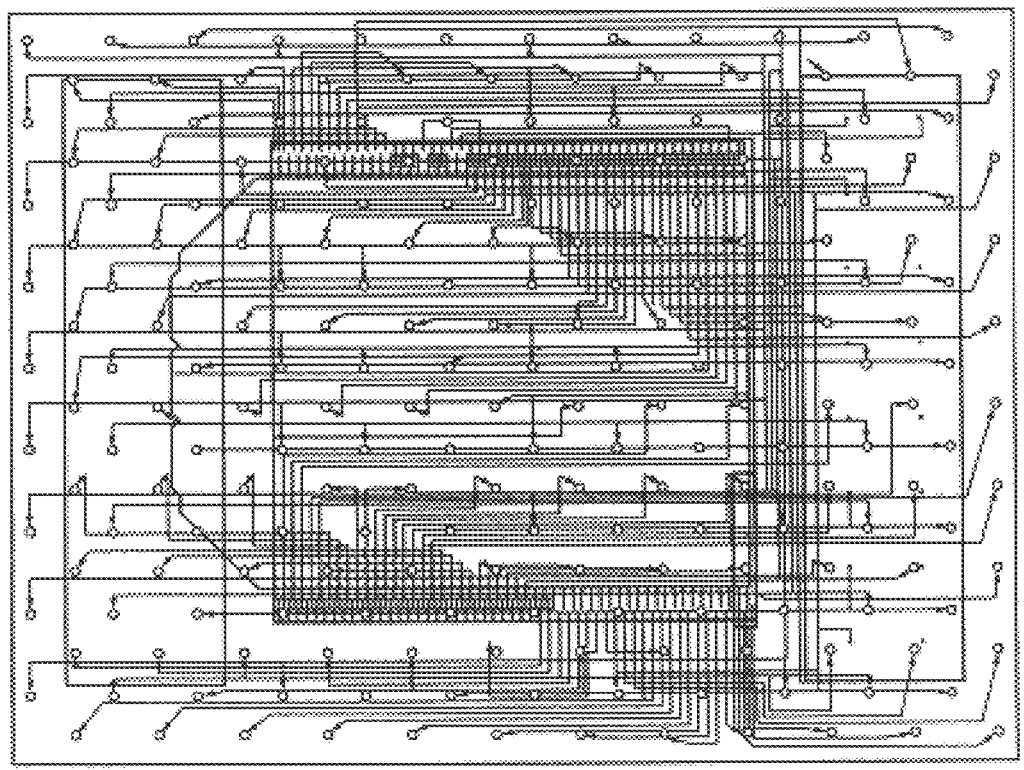
FIG. 40 depicts a composite drawing of a circuit board used by the system of FIG. 2.

The interconnect layers will be considered next. The remaining layout drawings of the CCB (FIGS. 35–40) illustrate the CCB interconnect layers. Five layers of interconnect are provided. FIG. 35 illustrates Metal 1, which is used to provide ground connections to the IC. FIG. 36 illustrates Metal 2 which is used for vertical routing primarily to connect to the IC pads and to vertically bus the transmit lines. FIG. 37 illustrates Metal 3 which is used for horizontal routing primarily for the receive lines. FIG. 38 illustrates Metal 4 which is used primarily for horizontal routing of the transmit lines. FIG. 39 illustrates Metal 5, which is used primarily for vertical routing to the transducer pad array bumps. FIG. 40 is a composite drawing of all levels.

Figure 23:
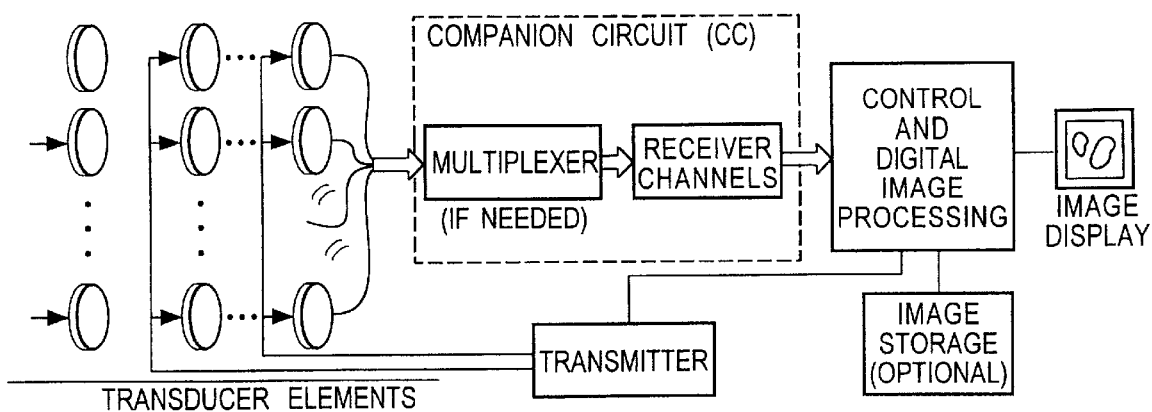
FIG. 23 depicts AVC circuitry that may be used within the system of FIG. 2.

The CCB circuitry will be considered next. The companion chip is combined with other circuitry to complete the Acoustic Video Converter (AVC) circuits shown in FIG. 23. Other circuit elements include the transmitter, the image display, optimal image storage, the transducer elements, and the control and image processing circuits. Power conditioning (not shown) is also required. All components except the companion chip can be realized with off-the-shelf components.

Figure 41:
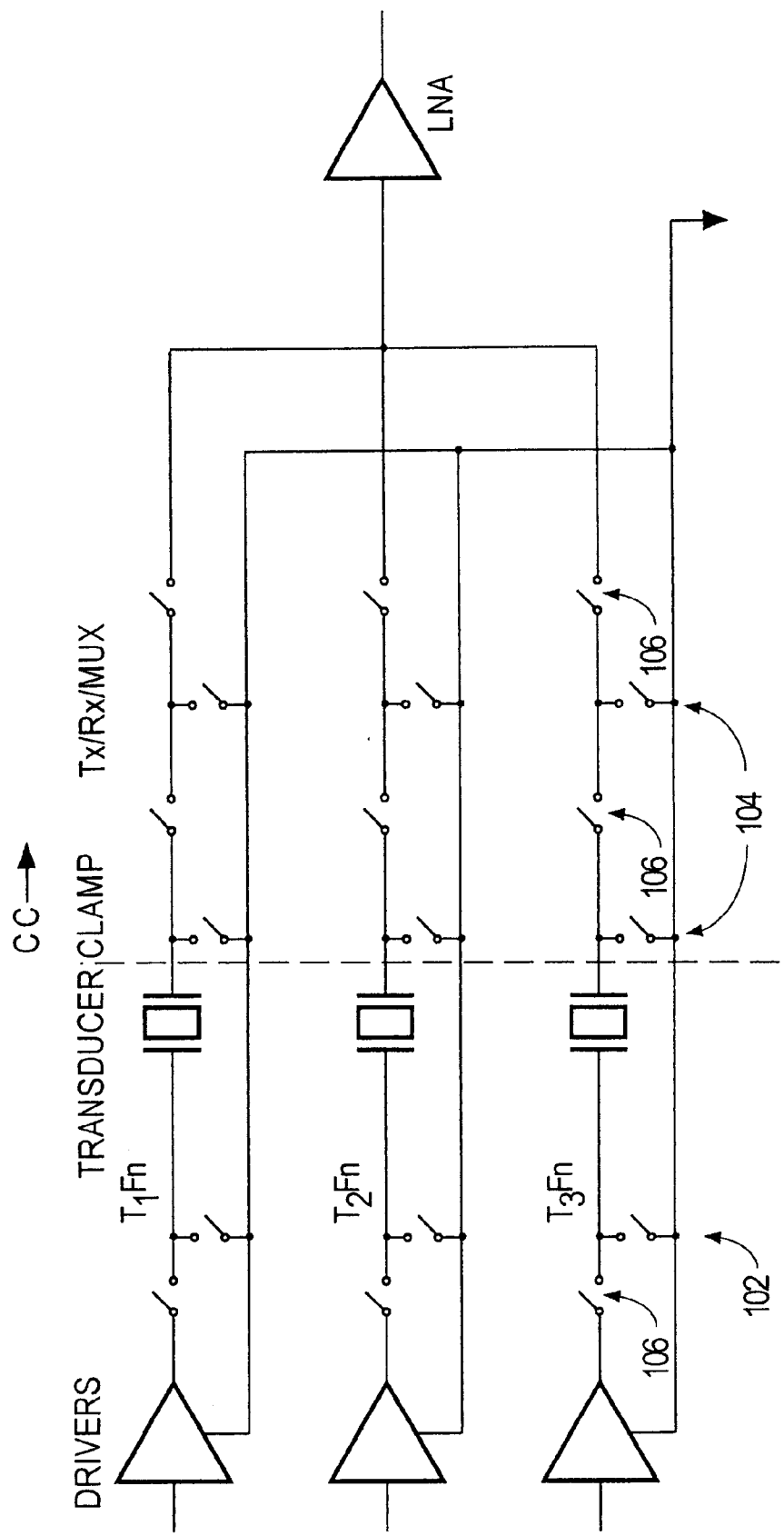
FIG. 41 depicts a switching system used by the system of FIG. 2.

The means of switching from transmit to receive and receive to transmit is believed to be unique. In transmit mode, the companion chip multiplexers are clamped to ground (using a set of grounding switches 104 (see FIG. 41)), grounding one side of each transducer element. Then, the transmitter drives the other side with a high voltage single-ended signal through a second set of switches 106. After transmission, the transmitter outputs are clamped to ground 102 and the multiplexers are released 104, thus grounding the opposite side of the transducer element. Another set of switches 106 close to connect the transducer to the LNA. When the acoustic echo activates the transducer, a single-ended voltage is developed at the multiplexer input ready for signal processing by the companion chip. Although this scheme does require independent access to both sides of each transducer element, a conventional, high voltage transmit/receive switch is not required! Eliminating this traditional switch is critical to building the circuitry required by each transducer within its footprint. An array of conventional, high voltage Tx/Rx switching transistors (e.g., DMOS) is physically too large to fit within the transducer tile footprint.

Figure 24:
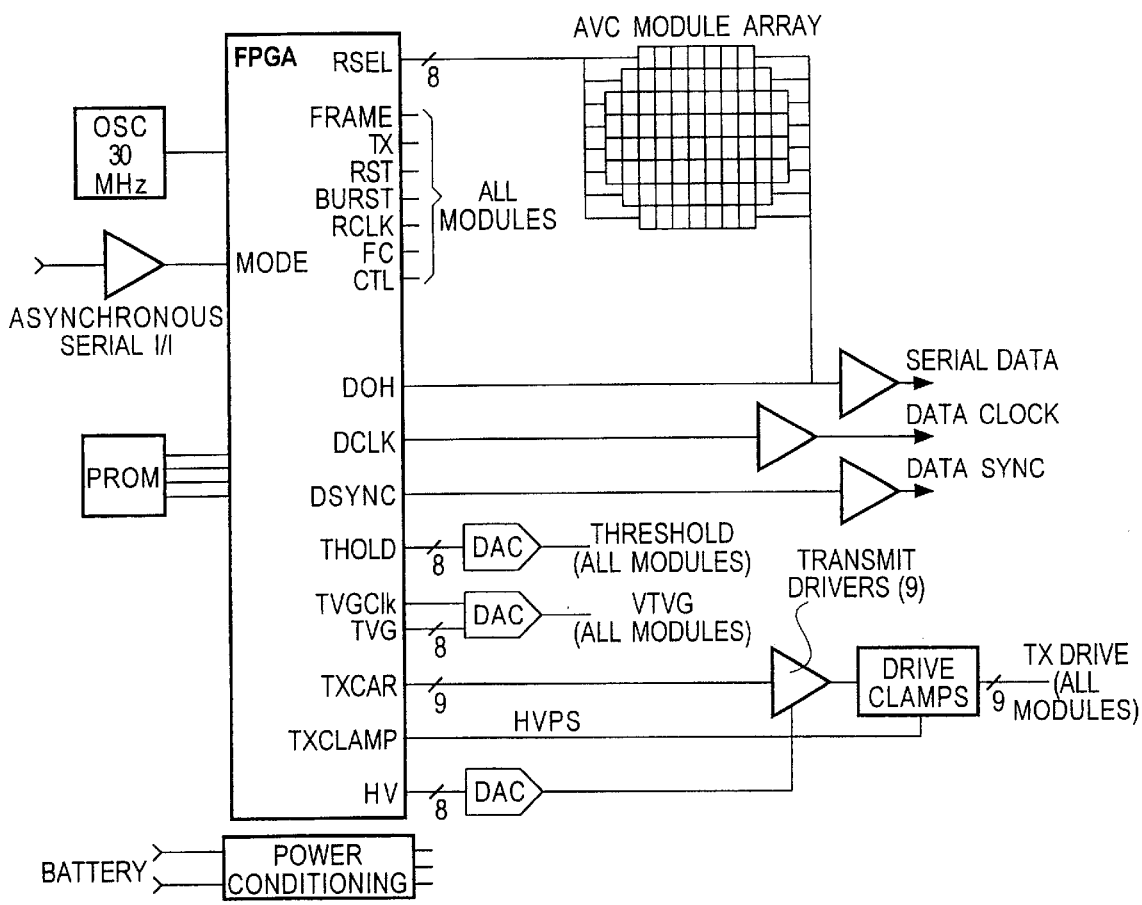
FIG. 24 depicts a complete AVC block diagram of the system of FIG. 2.

The complete AVC block diagram is shown in FIG. 24. the array of AVC modules (each with a companion chip) is controlled with a single field-programmable gate array (FPGA). The FPGA also programs digital-to-analog converters (DACs) to provide a threshold signal and a TVG control signal. It controls transmit/receive switching and serial data propagation. Power conditioning, oscillator, PROM, asynchronous interface, and buffer complete the AVC.

Figure 25:
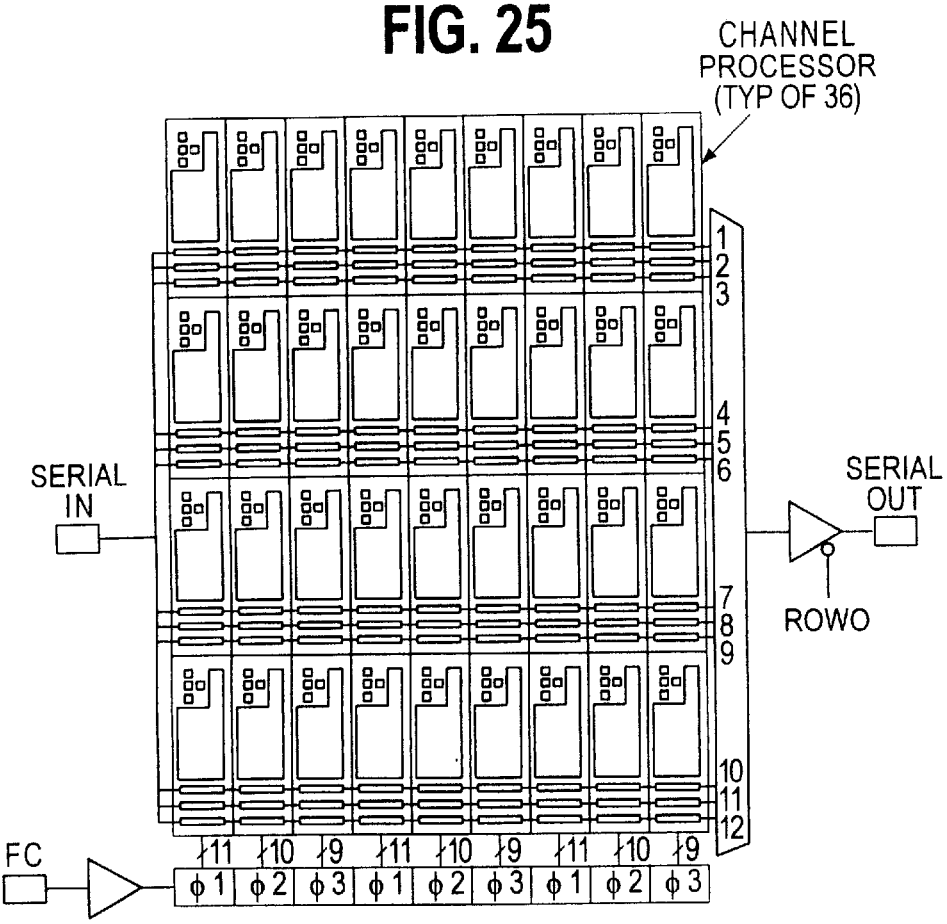
FIG. 25 depicts a companion chip floor plan that may be used by the system of FIG. 2.

The companion chip will be discuss next. A preliminary floor plan for the companion chip is presented in FIG. 25. Only 36 channel processors are required to serve 108 transducer elements, since only one third of the 108 transducer elements are active at any one time. FIG. 25 also shows that digital output data from all of the channel processors are linked serially, providing a single bit data output for the entire companion chip.

Figure 26:
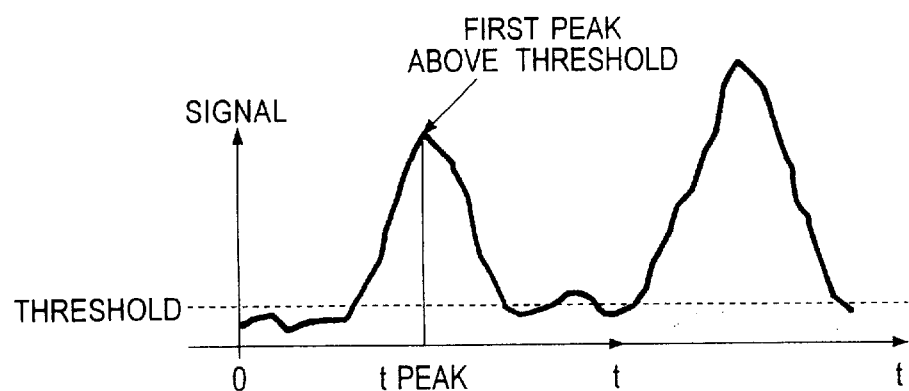
FIG. 26 depicts peak detector requirements of the system of FIG. 2.

The major signal processing function of the channel processor is to find the first peak in the return signal after the return signal exceeds a programmable threshold. This requirement is illustrated in FIG. 26. The driver will adjust the threshold to obtain the best image. The time from ping to first peak is used to subsequently create a range-based three-dimensional (3D) image.

Figure 27:
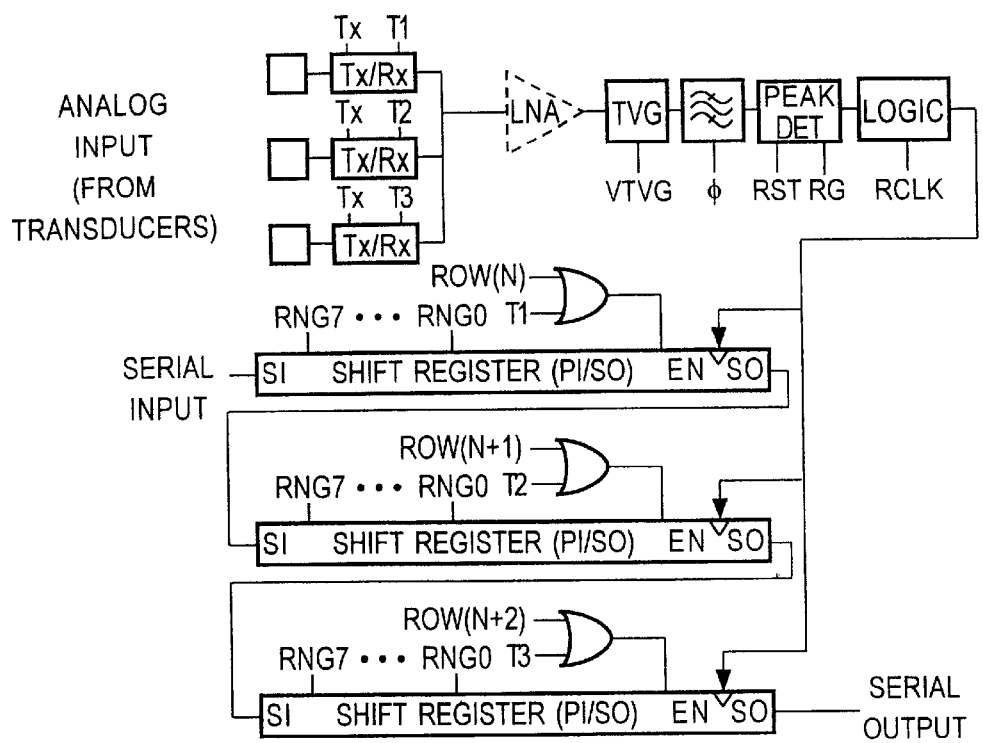
FIG. 27 depicts a channel processor of the system of FIG. 2.

An individual channel processor designed to perform peak detection is diagrammed in FIG. 27. After 3:1 multiplexing, a programmable threshold burst at the carrier frequency is combined with the echo signal. The composite signal is then buffered with a low noise amplifier (LNA). Gain is varied with time (TVG) to account for acoustic attenuation in seawater. A bandpass filter passes the frequency of interest while rejecting other frequencies. A re-settable peak detector then finds the first peak after the ping. Conventional digital logic is used to time the interval from ping to first peak. This (digital) time interval is loaded into a shift register for transmission off chip.

In addition to its functional and performance requirements, the companion chip must be small enough to fit within the CCB. Recall that the CCB must be small enough to fit within the footprint of the transducer tile it supports. In addition, the chip must draw minimal current from the batteries to assure adequate operating time underwater. these size and power constraints add a substantial challenge in realizing some of the channel processor circuit elements shown in FIG. 27. Two key circuits, the bandpass filter and the peak detector, are discussed in the following subsections.

The bandpass filter will be discuss first. The bandpass filter that was originally considered utilized a Charge Coupled Device (CCD) re-circulating structure to achieve adjacent channel rejection. Several problems with this filter structure discovered on other projects led to the abandonment of this approach. The primary problem is that limitations on the charge packet size severely limit the amount of input charge to the filter. This degrades the maximum SNR at the input 35 to 44 dB, which is well below system requirements. Alternate CCD approaches would require excessive power to implement.

Figure 28A:
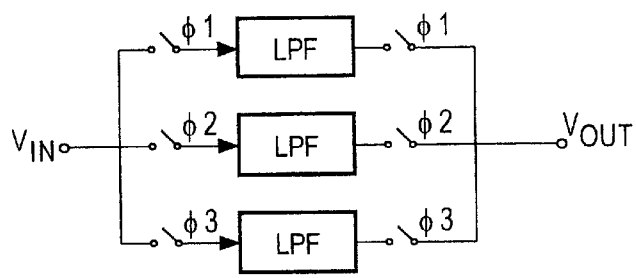
FIG. 28 depicts a 3-pass bandpass filter of the system of FIG. 2.
Figure 28B:
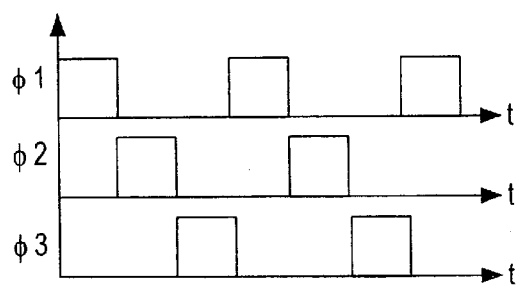

An alternative approach is to use switched capacitor (SC) technology for the bandpass filter. The SC filter implementation chosen is known as an N-Path filter. A simple 3-Path filter is shown in FIG. 28. Phased samplers pass the input signal, $V_{in}$, into three (or in general N) identical parallel, lowpass filters. The sampling on each parallel path occurs at the filter center frequency, which aliases frequency components centered on the sample frequency down to baseband, where they are passed through the low-pass filter. Phased switches at the filter's outputs shift the baseband signals back up to the center frequency. The clock period is divided into N equal intervals to establish the phases of the N switches. The advantage of this circuit is that the lowpass filters may be of relatively low order, such as second or third order. The lowpass filter response is translated up to the center frequency. The net effect is to produce the equivalent of a very high-Q filter using simple, relatively low order filters.

Figure 29A:
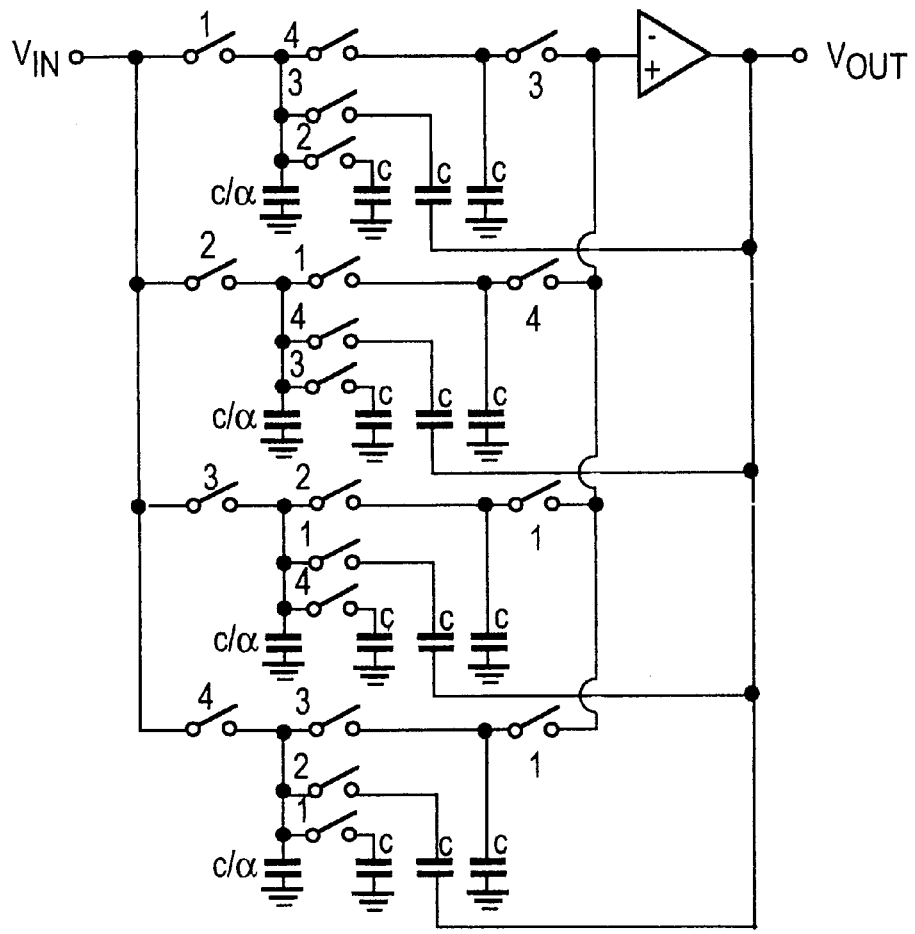
FIG. 29 depicts a single-ended Butterworth filter that may be used by the system of FIG. 2.
Figure 29B:
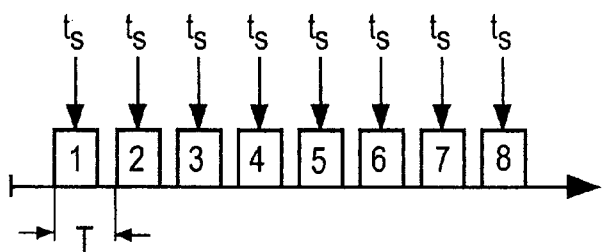

An implementation of a 4-path filter is shown in FIG. 29 for a third-order Butterworth filter. Only one op-amp is required, because it is multiplexed between the parallel paths of the lowpass filters.

The major advantage to SC filters is that the frequency response is determined by the clock frequency, which may be very accurate, and by capacitor ratios. Capacitor values may vary by 10% to 20%, but the ratios of capacitors may be easily matched to less than 1%, which means that the filter characteristics may be accurately determined.

The filter center frequency is set by the clock rate. Three different filter designs may be used. A 9-path filter will derive 9 phases from a 30 MHz base lock to give a center frequency of a 3.33 MHz. Similarly, 10-path and 11-path filters will have center frequencies of 3.00 MHz and 2.73 MHz, respectively.

Figure 30:
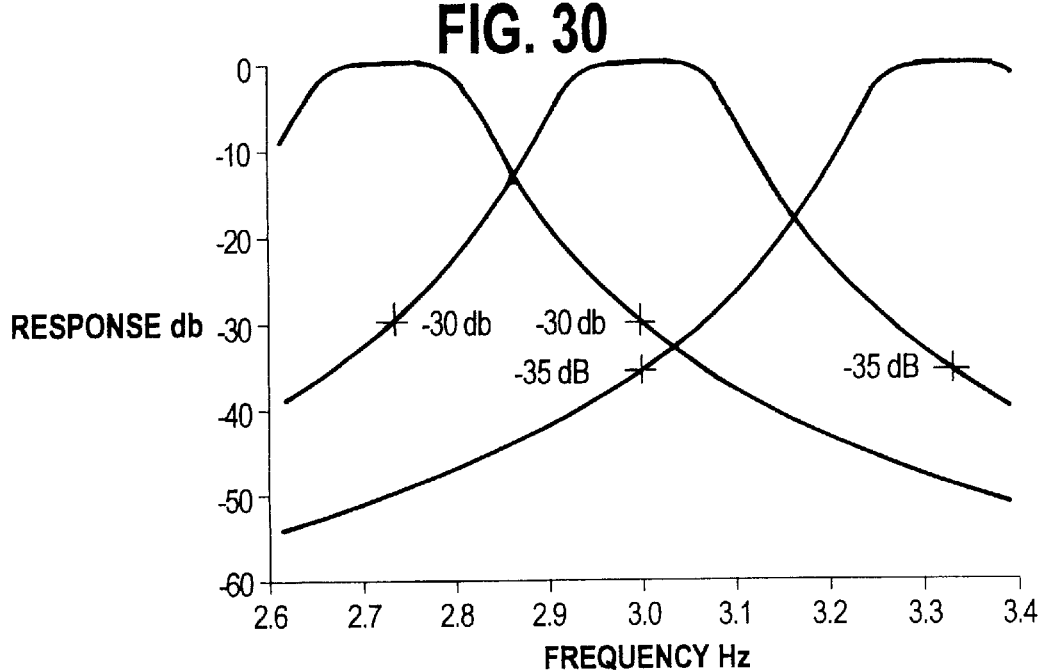
FIG. 30 depicts a N-path 150 kHz responses of the system of FIG. 2.
Figure 31:
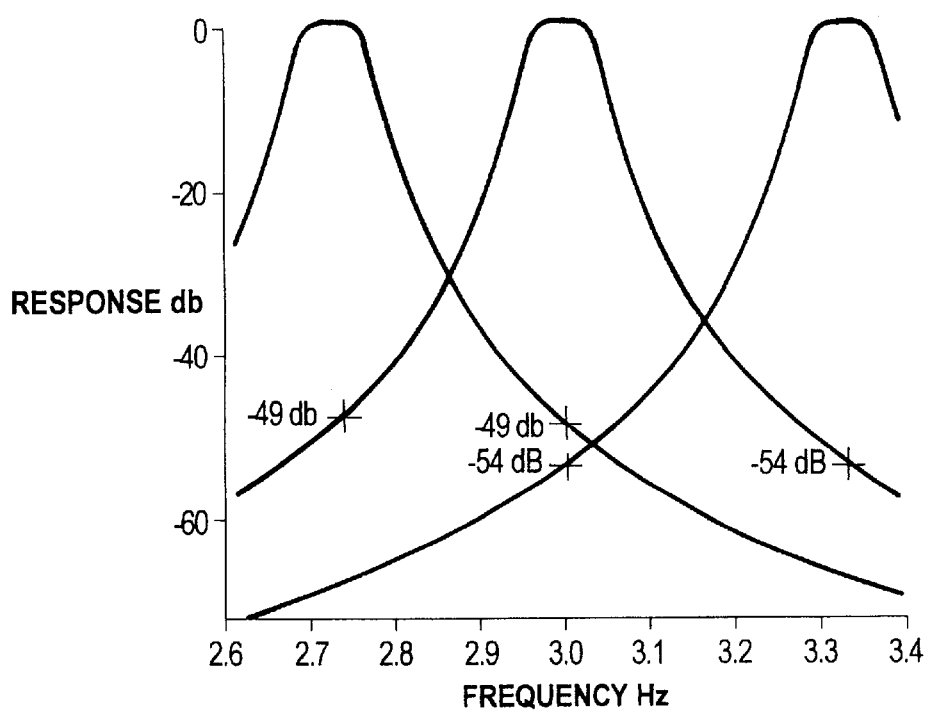
FIG. 31 depicts a N-path 75 kHz responses of the system of FIG. 2.

The bandwidth of the filters may be programmed to either 75 or 150 kHz by changing the size of a single capacitor in each filter. The responses of each of the filters are shown in FIGS. 30 and 31 for the 75 and 150 kHz cases. The isolation of the 75 kHz filter is 49 dB and the isolation of the 150 kHz filter is 30 dB, both acceptable according to the system specifications. The dynamic range of the filters is limited by both random noise and fixed-pattern noise. The random noise is determined by the capacitor size, and is less than 90 dB below a 2 $V_{pp}$ maximum signal. The more serious limit is clock feedthrough. Since the clocks are operating at the center frequency, there is no easy way to remove the feedthrough from the signal once it is injected into the signal path. This feedthrough is estimated to be 56 to 60 dB below maximum signal. This is acceptable, assuming a 26 dB TVG in a system that requires 76 dB dynamic range. There are other complex methods to minimize the in-band feedthrough, as described in prior references.

The peak detector will be considered next. The original proposed system used an envelope detector between the bandpass filters and the peak detector. One practical problem with an integrated envelope detector is that simple designs (as would be required in a highly integrated chip such as this) tend to have 5 to 10 mV deadbands near zero. These deadbands are due to the high offset voltages common in CMOS circuits. Fortunately, an envelope detector is not required, since the peak of the RF signal is identical to the peak of a detected signal. Therefore, the envelope detector has been eliminated, and the peak detection will be performed at RF. This requires a faster peak detector than would otherwise be required, but the speed is achievable.

Figure 42:
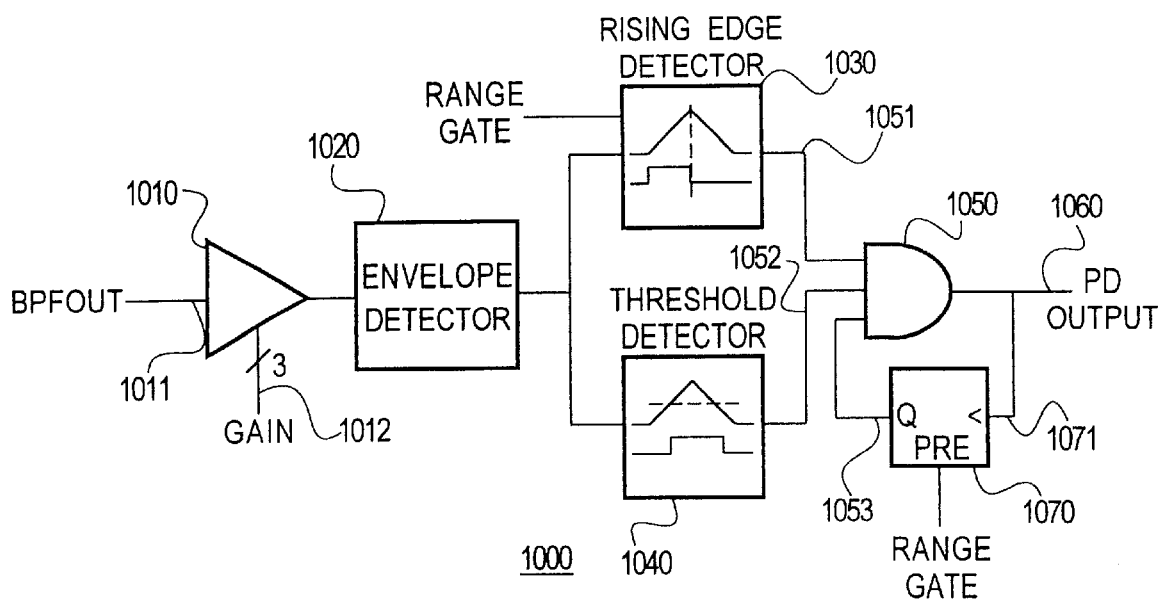
FIG. 42 depicts a peak detector circuit used by the system of FIG. 2.

FIG. 42 discloses an embodiment of a peak detector used in the claimed invention. The peak detector 1000 includes an input 1011 for receiving the output signal from a band filter. The input 1011 is connected to the input of a programmable gain amplifier 1010. The programmable gain amplifier has an digital input 1012 for setting the gain of amplifier 1010. The output of amplifier 1010 is connected to the input of an envelope detector. The output of envelope detector 1020 is connected to input of a rising edge detector 1030 and to the input of a threshold detector 1040. The output of the rising edge detector 1030 is connected to the first input 1051 of AND gate 1050. The output of the threshold detector 1040 is connected to the second input 1052 of AND gate 1050. Peak detector 1000 also includes a latch 1070. The clock input 1071 of latch 1070 is connected to the output 1060 of AND gate 1050. The output of latch 1070 is connected to the third input 1053 of AND gate 1050.

The peak detector 1000 of FIG. 42 operates in the following manner. The transducer element receives an input signal. The signal is an amplitude modulated waveform (i.e., a carrier frequency) that is compatible to the transducer. If the carrier frequency falls within the pass band of the band pass filter, the signal is then passed onto the input 1011 of peak detector 1000.

The input signal is amplified by the programmable gain amplifier 1020. The amplified signal is applied to the input of the envelope detector 1020. The envelope detector 1020 includes a rectifier and low pass filter that produces an envelope waveform that is a replica of the amplitude modulation. The envelope wave form is compared to a threshold voltage by the threshold detector 1040. The peak of the envelope is detected by rising edge detector 1030.

The output of rising edge detector 1030 transitions to a logic 0 when the peak of the envelope occurs. If the output of the threshold detector is also at a logic 1, a transition from 1 to 0 occurs at the output 1060 of AND gate 1050. This transition indicates the time the first peak above threshold occurs. The output 1060 of the peak detector 1000 is labeled PD OUTPUT.

Figure 43:
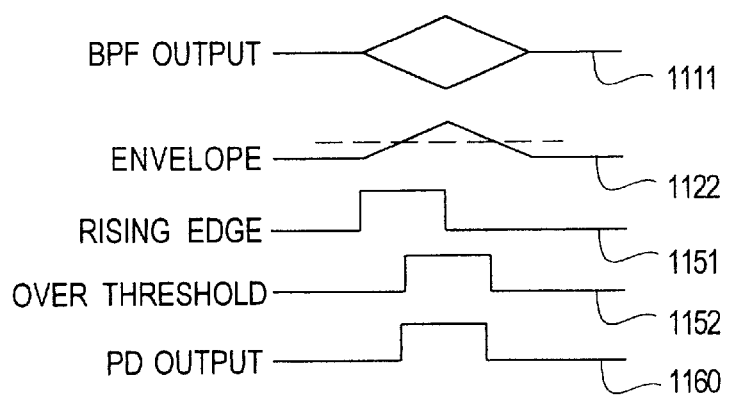
FIG. 43 depicts a set of waveforms produced by the peak detector of FIG. 42.

FIG. 43. discloses typical waveforms of the peak detector 1000 of FIG. 42. The following waveforms are shown on FIG. 43. The output of the band pass filter, BPFOUT 1111 is the applied input to the peak detector. ENVELOPE 1122 on FIG. 43 is a typical waveform at the output of envelope detector 1020. RISING EDGE 1151 is a typical digital waveform at the output of the rising edge detector 1030 of FIG. 42 OVER THRESHOLD 1152 is a digital waveform indicating the envelope exceeds threshold at the output of threshold detector 1040. PD OUTPUT 1160 is the digital waveform at the output 1060 of the peak detector 1000.

Figure 44:
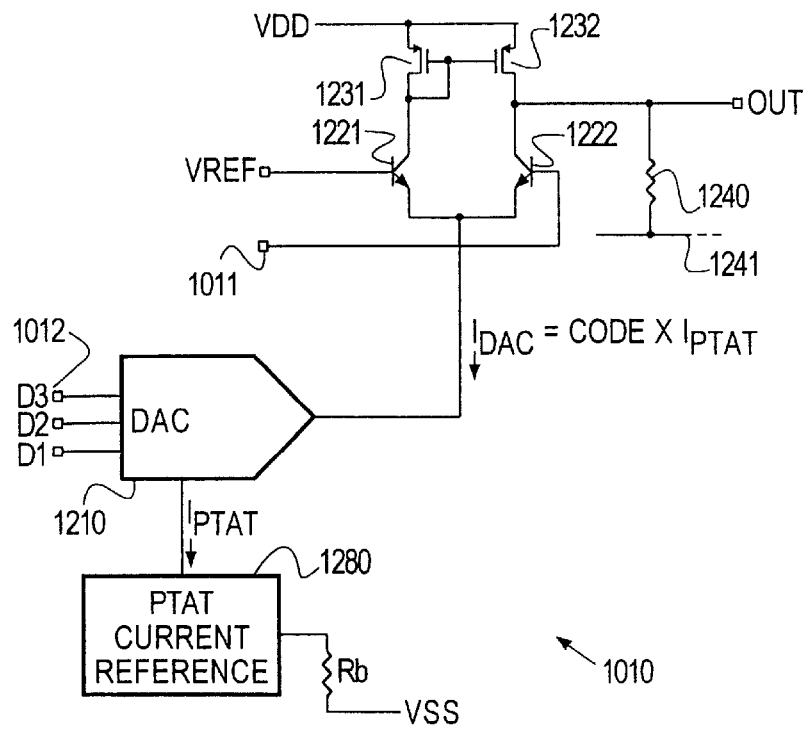
FIG. 44 depicts details of the programmable gain amplifier of FIG. 42.

FIG. 44 discloses the programmable gain amplifier 1010 of FIG. 42. The amplifier 1010 includes a current digital to analog converter (DAC) 1210, responsive to the digital code applied at the digital input 1012. Amplifier 1010 also includes a differential amplifier comprising first and second bipolar transistors 1221 and 1222 and current mirror MOS transistors 1231 and 1232. The output of the differential amplifier is terminated by resistor 1240 to a supply voltage node 1241. Amplifier 1010 also includes a PTAT (proportional to absolute temperature) current reference 1280.

Programmable amplifier 1010 of FIG. 44 operates in the following manner. A digital code (CODE) is applied to the gain control input 1012, which activates a corresponding output current from the current DAC 1210. The output current of the DAC 1210 is the current supplied to the emitters of bipolar transistors 1221 and 1222 of the differential amplifier. As such the voltage gain of differential amplifier is obtained from the following equation:

$$A_v = \frac{eI_{dac}R}{KT},$$

where $e=1.609\times10^{-19}$ coul, $K=1.38\times10^{-23}$ joul/deg K, T=temperature in deg K, R=output resistance in ohms, $I_{dac}$=DAC output current in amps. The output current DAC using PTAT 1280 is: Idac=[CODE] [1/Rb] [KT/e ln M], where "CODE" is the numerical value of the code going into the DAC, Rb is a resistor used within the PTAP power source and M is a multiplier value using in the PTAP current source. The voltage gain becomes: Av=[CODE] R/Rb. The programmable gain amplifier 1010 of FIG. 44. provides adjustable gain to equalize for variations within the array of transducers or to compensate for other channel mismatches.

Figure 45:
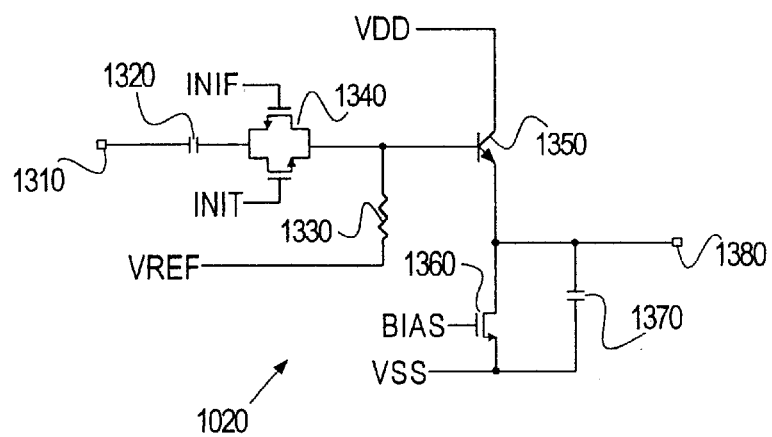
FIG. 45 depicts details of the envelope detector of FIG. 42.

FIG. 45 discloses in detail the envelope detector 1020 of FIG. 43. The envelope detector 1020 comprises an input 1310, coupling capacitor 1320 and resistor 1330, a MOS transfer gate 1340, an emitter follower transistor 1350, a MOS transistor 1360 that provides a pulldown current, a filter capacitor 1370 and an output 1380.

The envelope detector of FIG. 45 operates in the following manner. Transfer gate 1340 is open during initialization, whereby the base of emitter follower transistor 1350 is biased to reference voltage VREF through resistor 1330. The emitter current of the emitter follower transistor 1350 is established by MOS transistor 1360. During peak detection, transfer gate 1340 is on. The signal from the programmable gain amplifier is connected to the input of the source follower by capacitor 1320. The emitter of the source follower charges the filter capacitor 1370 during the positive intervals of the input signal. The emitter follower is reversed biased during negative intervals of the input wave form. As such, filter capacitor 1370 follows the positive peaks of the input waveform. The rate of fall at the output 1380 is established by the capacitance of filter capacitor 1370 and the drain current of MOS transistor 1360. As such an envelope waveform is produced at the output of the envelope detector.

Figure 46:
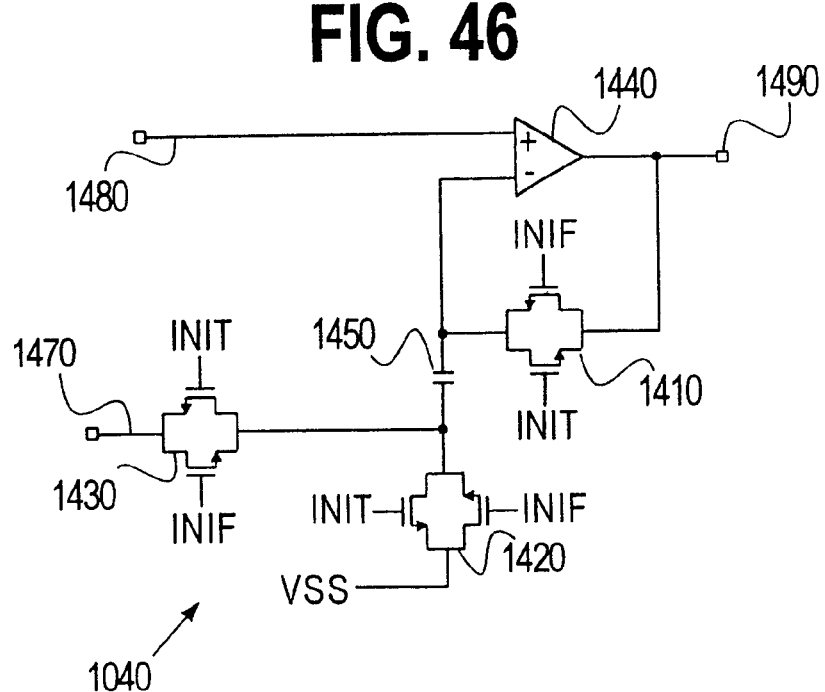
FIG. 46 depicts details of the threshold detector of FIG. 42.

FIG. 46 discloses more detail of threshold detector 1040 of FIG. 42. Threshold detector 1040 comprises an input 1480, a comparator 1440, a first transfer gate 1410, second transfer gate 1420, third transfer gate 1430, capacitor 1450, a threshold input 1470 and an output 1490. First capacitor 1410 is connected from the output to the inverting input of the comparator 1440. The inverting input is connected to the first terminal of capacitor 1450. The second transfer gate 1420 is connected between the second terminal of capacitor 1450 and ground. The third transfer gate 1430 is connected between the second terminal of capacitor 1450 and the threshold input 1470.

The threshold detector of FIG. 46 operates in the following manner. During initialization, first transfer gate 1410 and second transfer gate 1420 are closed. The offset of comparator 1440 is stored onto capacitor 1450. During peak detection, first and second transfer gates are open, and third transfer gate 1430 is closed. Capacitor 1450 retains the offset of the comparator, which is added to the threshold voltage applied to input 1470. When the sum exceeds the reference input, the output switches state.

Figure 47:
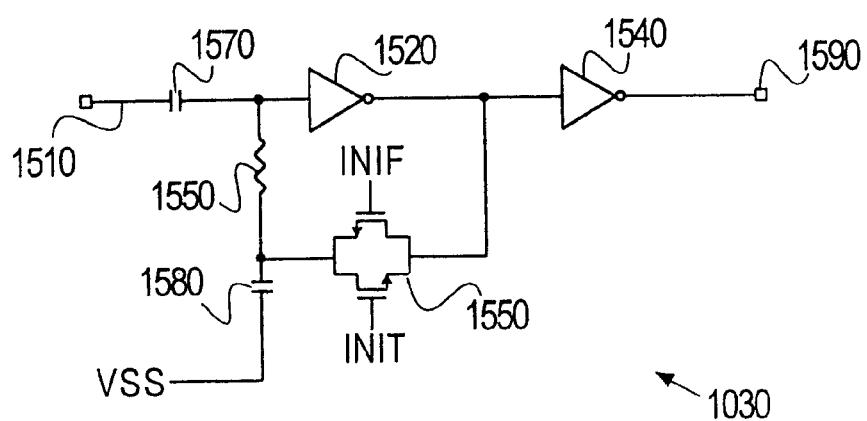
FIG. 47 depicts details of the rising edge detector of FIG. 42.

FIG. 47 discloses more detail of rising edge detector 1330 of FIG. 42. The rising edge detector of FIG. 47 includes an input 1510, first CMOS inverter 1520, second CMOS inverter 1540, a transfer gate 1550, resistor 1560, coupling capacitor 1570, offset capacitor 1580 and output 1580.

Rising edge detector of FIG. 47 operates in the following manner. During initialization, transfer gate 1550 connects the output of first CMOS inverter 1520 to the input. As such, the threshold voltage of the first inverter is stored on the capacitor 1580. During the peak detection interval, transfer gate 1550 is open. A rising waveform from the envelope detector maintains a positive voltage across resistor 1560. As such the output of first CMOS inverter is low and the output of the second CMOS inverter is high. When the peak occurs, a falling waveform occurs, whereby the voltage across resistor 1560 becomes negative. As such, the output of second transfer gate is logic 0.

A new high resolution imaging sonar has been described for use by swimmers seeking to identify objects in turbid water or under low light level conditions. Beam forming for both the transmit and receive functions is performed with acoustic lenses. The acoustic image is focussed on an acoustic retina or focal plane. An acoustic video converter (AVC) converts the acoustic image to an electronic form suitable for display with conventional electronics (e.g., VGA). The image will be presented to the swimmer as a heads-up display on the face of his or her mask.

A specific embodiment of a method and apparatus for performing acoustic imaging has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

What is claimed is:

1. An acoustic/video processing stack of a plurality of substantially identical acoustic/video processing stacks for attachment to a processing stack backplane and which together generate a VGA signal for display of a three-dimensional acoustic image, the acoustic/video processing stack comprising:
    a two-dimensional array of transducer elements;
    a companion chip block coupled to and adapted to transceive acoustic signals under a time-division multiplexed format through the transducer elements and to provide a portion of the VGA signal together generated by the plurality of acoustic/video processing stacks; and
    a backing block disposed between the two-dimensional array and companion chip block and adapted to acoustically isolate the two-dimensional transducer array from the companion chip block, said companion chip block and backing block being of a size and diameter substantially the same as the two-dimensional transducer array.

2. The acoustic/video processing stack of claim 1 wherein the companion chip block further comprising a carrier adapted to attach the companion chip block to the processing stack backplane.

3. The acoustic/video processing stack of claim 2 wherein the carrier further comprises an extraction pin adapted to align the companion chip block to the plurality of other acoustic/video processing stacks on the processing stack backplane.

4. The acoustic/video processing stack of claim 3 wherein the carrier further comprises a plurality of electrical connection pins adapted to electrical contacts with the processing stack backplane.

5. The acoustic/video processing stack of claim 4 wherein the companion chip carrier further comprises a chip scale package adapted to form connections between the two-dimensional array, a companion chip within the chip scale package and the plurality of electrical connection pins of the carrier.

6. The acoustic/video processing stack of claim 1 wherein the carrier and chip scale package further comprises a plurality of complementary ohmic contacts.

7. The acoustic/video processing stack of claim 1 wherein the backing block further comprises a rubberized epoxy with an inorganic filler.

8. The acoustic/video processing stack of claim 6 wherein the backing block further comprises a plurality of plated-through vias.

9. A method of generating three-dimensional acoustic images using a two-dimensional array of transducer elements, such method comprising the steps of:
    grounding a first lead of the transducer element of the two-dimensional array of transducer elements and transmitting an acoustic signal through a second lead of the transducer; and
    grounding the second lead and detecting a reflected portion of the transmitted acoustic signal through the first lead of the transducer.

10. The method of generating three-dimensional acoustic images as in claim 9 further comprising exciting a first set of transducer elements of the two-dimensional array of transducer elements with a first excitation frequency and a second set of elements of the two-dimensional array with a second excitation frequency.

11. The method of generating acoustic images as in claim 10 further comprising exciting a third set of the transducer elements of the two-dimensional acoustic array of transducer elements with a third excitation frequency.

12. The method of generating acoustic images as in claim 11 further comprising distributing transducer elements of the first, second and third sets over the two-dimensional array such that any transducer element of any one set is at least three elements away from any other member of that set.

13. The method of generating acoustic images as in claim 12 further comprising time division multiplexing the excitation of the three sets of transducer elements.

14. The method of generating acoustic images as in claim 13 wherein the step of time division multiplexing the excitation of the three sets of transducer elements further comprises exciting a first row of transducer elements during a first time period and a second row of transducer elements during a second time period.

15. The method of generating acoustic images as in claim 14 wherein the step of time division multiplexing the excitation of the three sets of transducer elements further comprises exciting a third row of transducer elements during a third time period.

16. The method of generating acoustic images as in claim 15 further comprises detecting a reflected signal of the first excitation frequency by the first set of transducer elements, the second excitation frequency by the second set of transducer elements and the third excitation frequency by the third set of transducer elements.

17. The method of generating acoustic images as in claim 16 further comprising using a single channel processor for processing a reflected signal detected through a transducer element of the first row, a transducer element of the second row and a transducer element of the third row.

18. The method of generating acoustic images as in claim 17 further comprising detecting a ping to first peak within the single channel processor as a measure of range.

19. The method of generating acoustic images as in claim 18 wherein the step of detecting a ping to first peak further comprises comparing a previous peak value of the reflected signal with a current peak value of the reflected signal.

20. The method of generating acoustic images as in claim 9 further comprising generating the images as a signal for driving a VGA display within a stack of processing elements which further comprise the two-dimensional array of transducer elements, a backing block and a companion chip block.

21. The method of generating acoustic images as in claim 20 further comprising using an acoustic isolating material for the backing block.

22. An apparatus for generating three-dimensional acoustic images using a two-dimensional array of transducer elements, such apparatus comprising:
  means for grounding a first lead of the transducer element of the two-dimensional array of transducer elements and transmitting an acoustic signal through a second lead of the transducer; and
  means for grounding the second lead and detecting a reflected portion of the transmitted acoustic signal through the first lead of the transducer.

23. The apparatus for generating three-dimensional acoustic images as in claim 22 further comprising means for exciting a first set of transducer elements of the two-dimensional array of transducer elements with a first excitation frequency and a second set of elements of the two-dimensional array with a second excitation frequency.

24. The apparatus for generating acoustic images as in claim 23 further comprising means for exciting a third set of the transducer elements of the two-dimensional acoustic array of transducer elements with a third excitation frequency.

25. The apparatus for generating acoustic images as in claim 24 further comprising means for distributing transducer elements of the first, second and third sets over the two-dimensional array such that any transducer element of any one set is at least three elements away from any other member of that set.

26. The apparatus for generating acoustic images as in claim 25 further comprising means for time division multiplexing the excitation of the three sets of transducer elements.

27. The apparatus for generating acoustic images as in claim 26 wherein the means for time division multiplexing the excitation of the three sets of transducer elements further comprises means for exciting a first row of transducer elements during a first time period and a second row of transducer elements during a second time period.

28. The apparatus for generating acoustic images as in claim 27 wherein the means for time division multiplexing the excitation of the three sets of transducer elements further comprises means for exciting a third row of transducer elements during a third time period.

29. The apparatus for generating acoustic images as in claim 28 further comprises means for detecting a reflected signal of the first excitation frequency by the first set of transducer elements, the second excitation frequency by the second set of transducer elements and the third excitation frequency by the third set of transducer elements.

30. The apparatus for generating acoustic images as in claim 29 further comprising means for using a single channel processor for processing a reflected signal detected through a transducer element of the first row, a transducer element of the second row and a transducer element of the third row.

31. The apparatus for generating acoustic images as in claim 30 further comprising means for detecting a ping to first peak within the single channel processor as a measure of range.

32. The apparatus for generating acoustic images as in claim 31 wherein the means for detecting a ping to first peak further comprises means for comparing a previous peak value of the reflected signal with a current peak value of the reflected signal.

33. An apparatus for generating three-dimensional acoustic images using a two-dimensional array of transducer elements, such apparatus comprising:
  a first switch adapted to ground a first lead of the transducer element of the two-dimensional array of transducer elements and transmitting an acoustic signal through a second lead of the transducer; and
  a second switch adapted to ground the second lead and detecting a reflected portion of the transmitted acoustic signal through the first lead of the transducer.

34. An apparatus for generating three-dimensional acoustic images using a two-dimensional array of transducer elements, such apparatus comprising:
  the two-dimensional array of transducer elements;
  a plurality of switches adapted to operably divide the two dimensional array of transducer elements into frequency divided subarrays of elements; and
  a peak detector for detecting a peak value of a reflected signal from the frequency divided subarrays.

35. An apparatus for generating three-dimensional acoustic images as in claim 34 wherein the peak detector further comprises a programmable amplifier.

36. An apparatus for generating three-dimensional acoustic images as in claim 34 wherein the peak detector further comprises a envelope detector.

37. An apparatus for generating three-dimensional acoustic images as in claim 34 wherein the peak detector further comprises a rising edge detector.

38. An apparatus for generating three-dimensional acoustic images as in claim 34 wherein the peak detector further comprises a threshold detector.

* * * * *